US008780224B2

(12) United States Patent
Tanaka

(10) Patent No.: US 8,780,224 B2
(45) Date of Patent: Jul. 15, 2014

(54) IMAGING DEVICE, METHOD AND COMPUTER READABLE MEDIUM FOR GENERATING A BLUR-ADJUSTED IMAGE ON THE BASIS OF A REFERENCE IMAGE AND A NON-REFERENCE IMAGE

(71) Applicant: Fujifilm Corporation, Tokyo (JP)

(72) Inventor: Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/933,205

(22) Filed: Jul. 2, 2013

(65) Prior Publication Data

US 2013/0286259 A1    Oct. 31, 2013

Related U.S. Application Data

(63) Continuation of application No. PCT/JP2011/078951, filed on Dec. 14, 2011.

(30) Foreign Application Priority Data

Mar. 31, 2011  (JP) ................................. 2011-080034

(51) Int. Cl.
*H04N 5/228* (2006.01)

(52) U.S. Cl.
USPC ..................................................... 348/222.1

(58) Field of Classification Search
USPC ..................................................... 348/222.1
See application file for complete search history.

(56) References Cited

U.S. PATENT DOCUMENTS

| 6,856,708 | B1 | 2/2005 | Aoki |
| 2005/0105823 | A1 | 5/2005 | Aoki |
| 2008/0259172 | A1* | 10/2008 | Tamaru ....................... 348/218.1 |
| 2008/0259176 | A1 | 10/2008 | Tamaru |
| 2009/0196522 | A1 | 8/2009 | Hikida |
| 2010/0177208 | A1* | 7/2010 | Tamaru et al. ............. 348/222.1 |

FOREIGN PATENT DOCUMENTS

| JP | 2000-251060 A | 9/2000 |
| JP | 2008-271240 A | 11/2008 |
| JP | 2009-188490 A | 8/2009 |

OTHER PUBLICATIONS

International Search Report Issued in PCT/JP2011/078951 mailed on Mar. 27, 2012.
Written Opinion Issued in PCT/JP2011/078951 mailed on Mar. 27, 2012.
Chinese Office Action issued for Chinese Patent Application No. 201180066522.6, dated Feb. 8, 2014 with partial English language translation.

* cited by examiner

*Primary Examiner* — Gary C Vieaux
(74) *Attorney, Agent, or Firm* — Birch, Stewart, Kolasch & Birch, LLP

(57) ABSTRACT

An imaging device includes an imaging unit that acquires plural images including an image in which a main subject is in focus, by discretely moving a focus position and successively capturing the images; an image processing unit that executes image processing to at least one of a reference image and a non-reference image to bring degrees of blur thereof closer to one another, the reference image being an image in which the main subject is in focus; a detection unit that detects corresponding points of subjects in the image-processed reference image and non-reference image, a deformation unit that deforms the non-reference image before the image processing such that the positions of the corresponding points coincide, a generation unit that generates a blur-adjusted image on the basis of the reference image and the deformed non-reference image; and a recording unit that stores the blur-adjusted image at a recording medium.

12 Claims, 18 Drawing Sheets

FIG.6

| 0 | 1 | 0 |
|---|---|---|
| 1 | −4 | 1 |
| 0 | 1 | 0 |

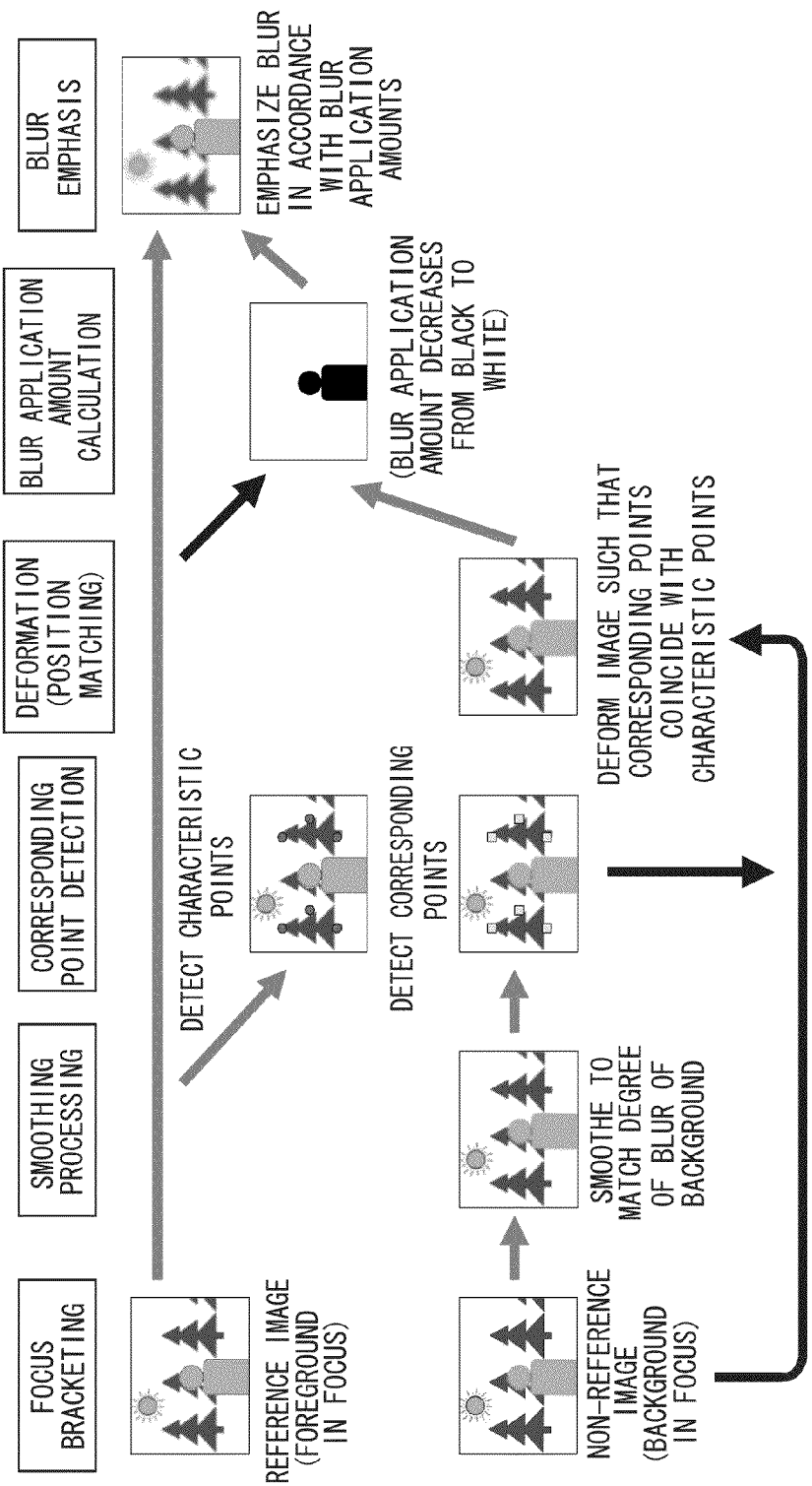

DIVISION REGIONS

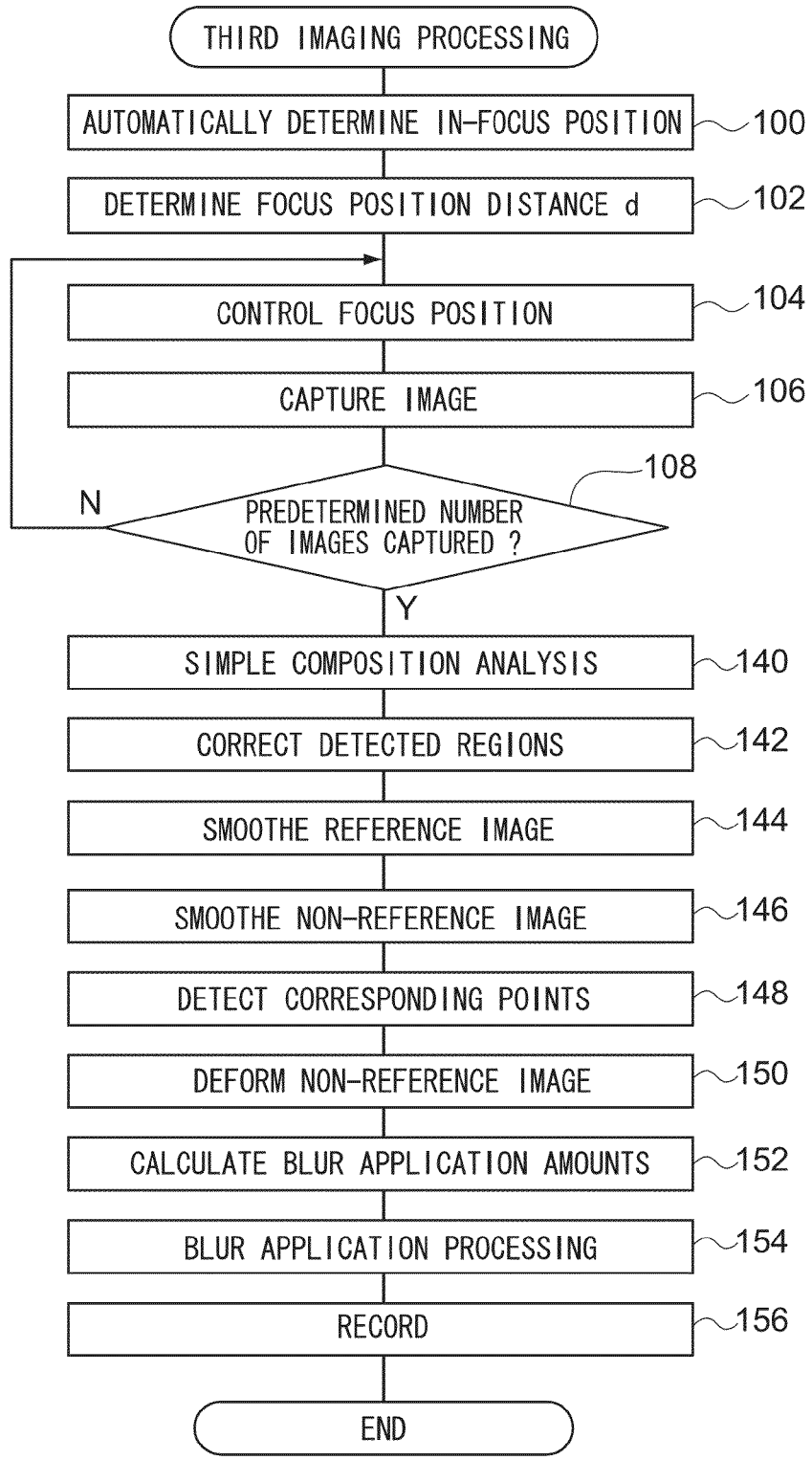

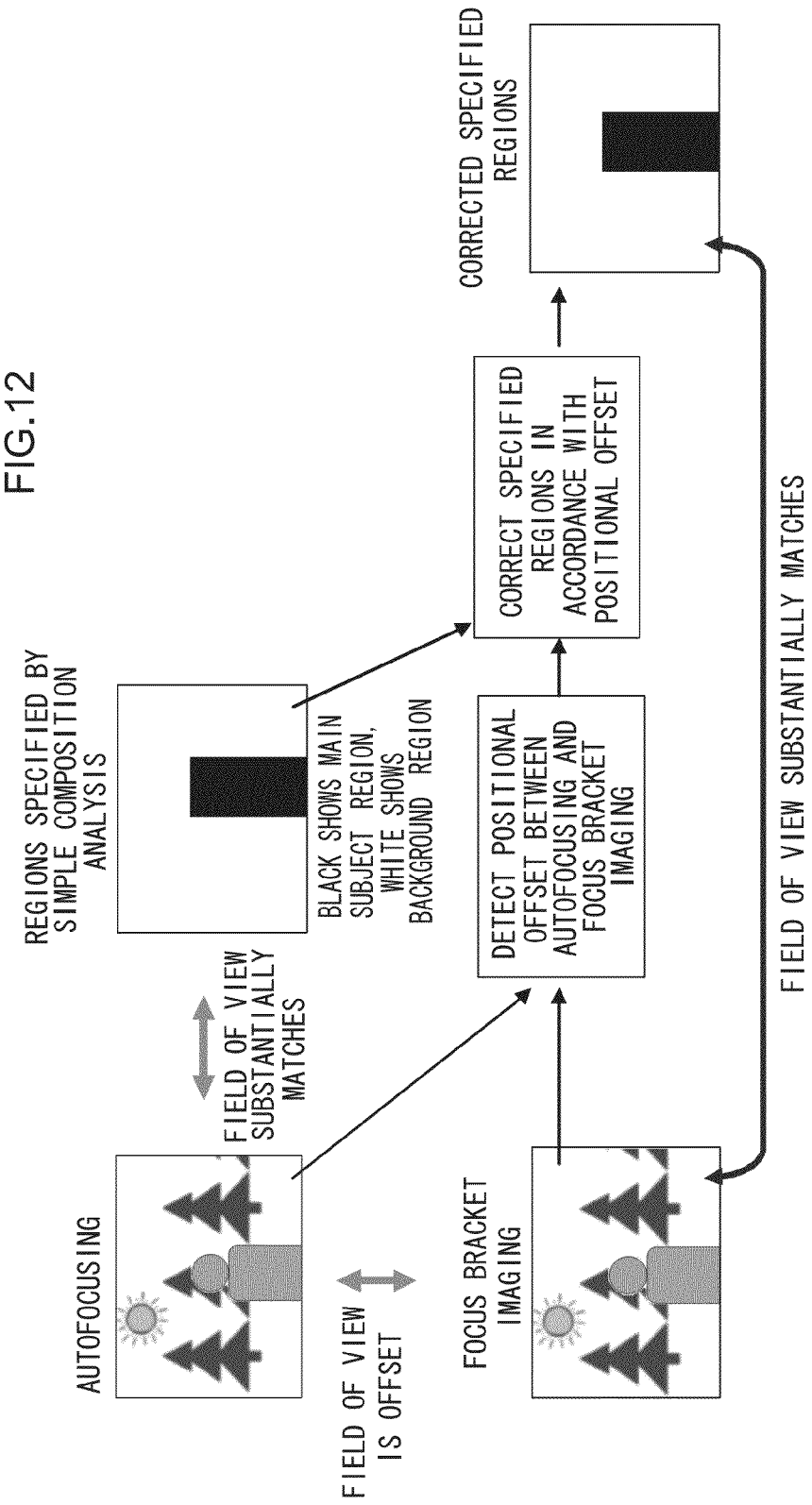

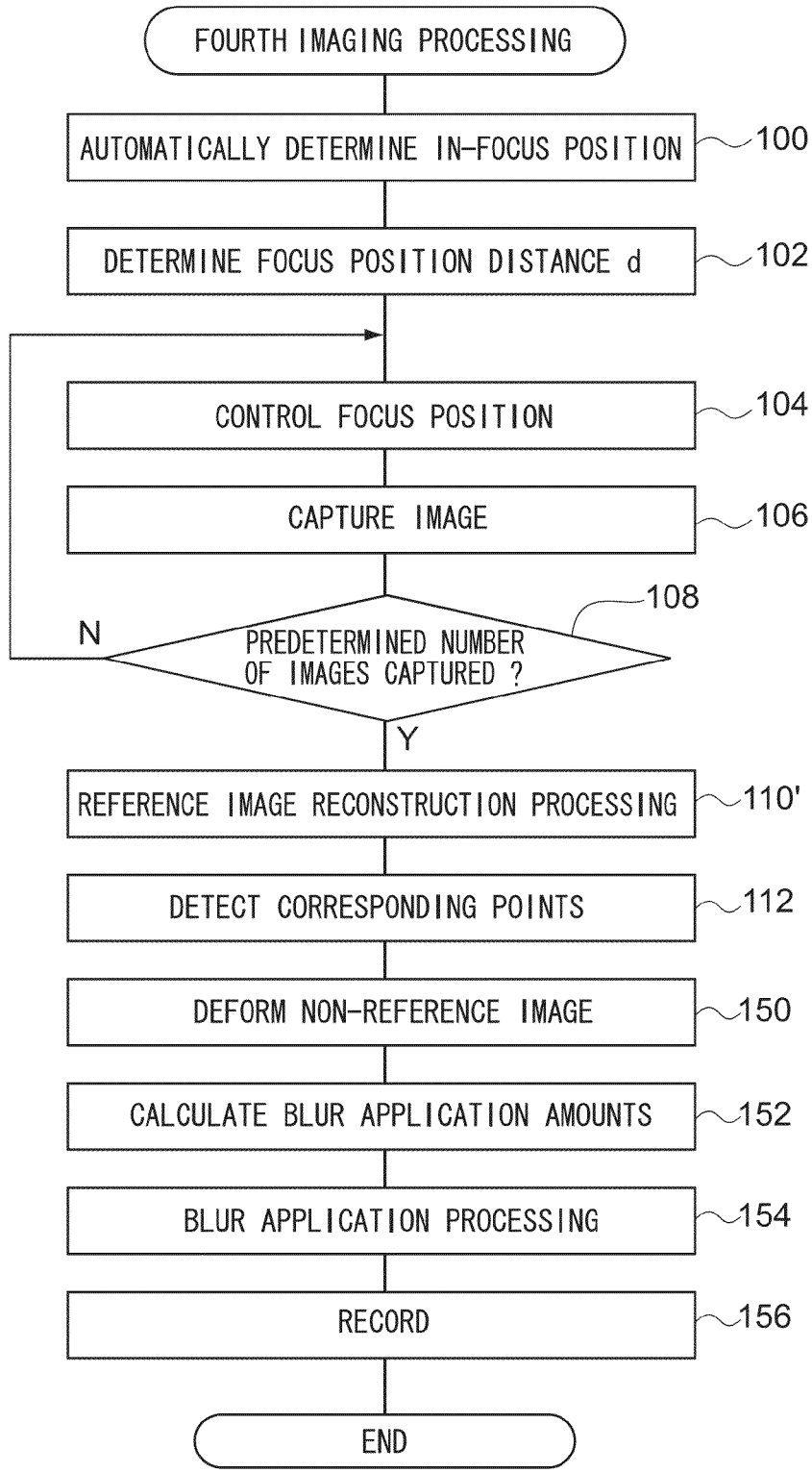

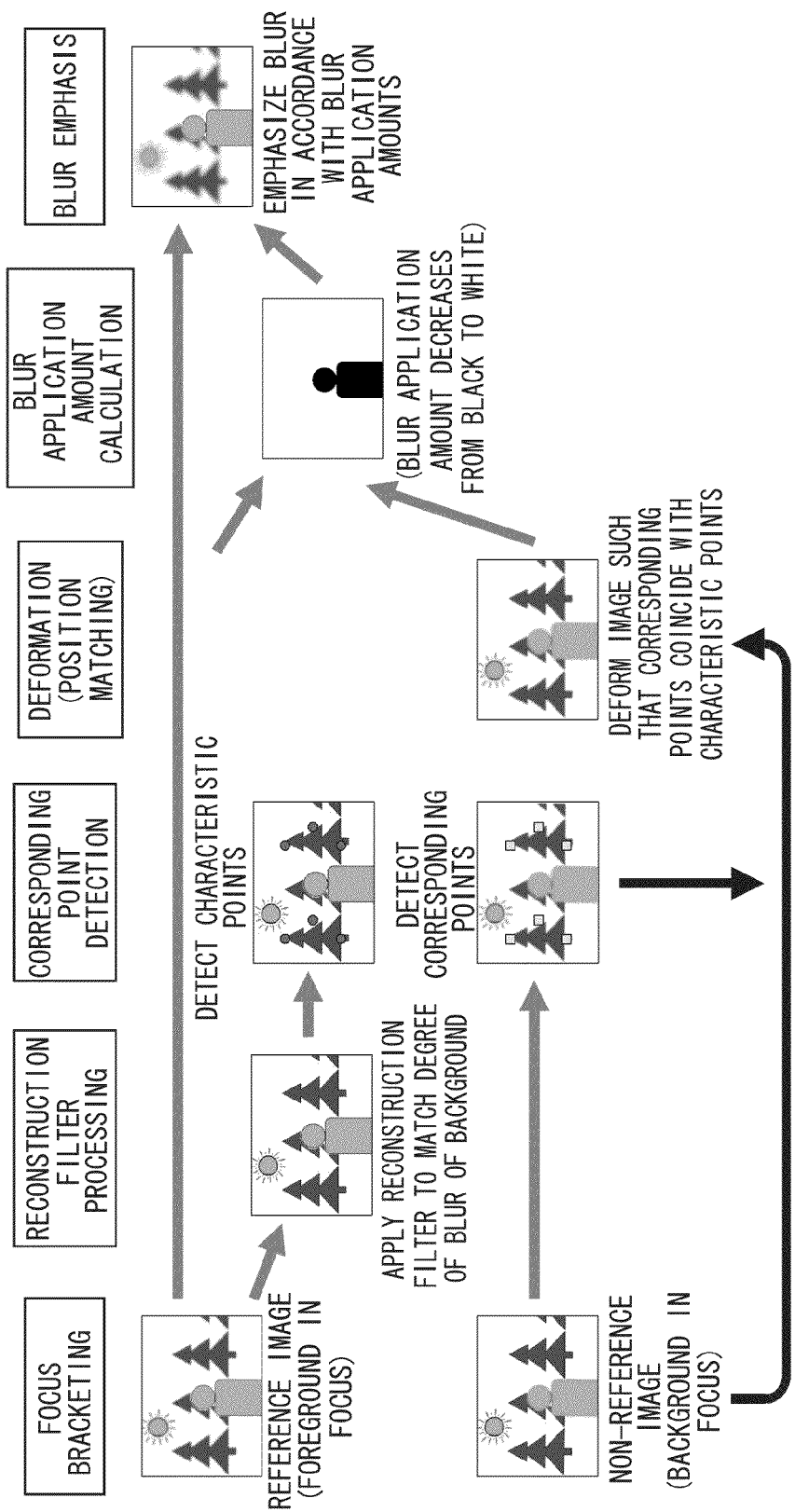

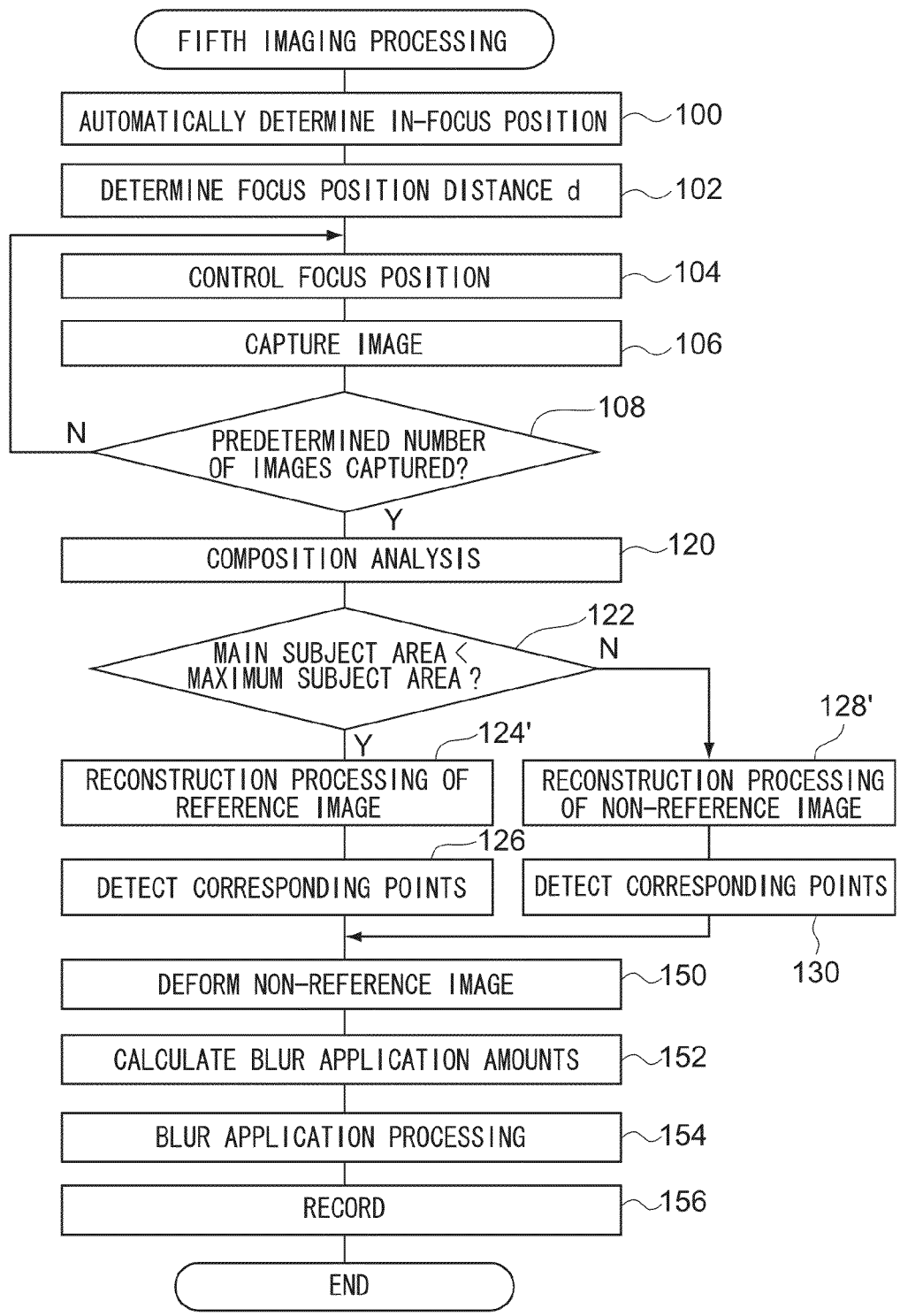

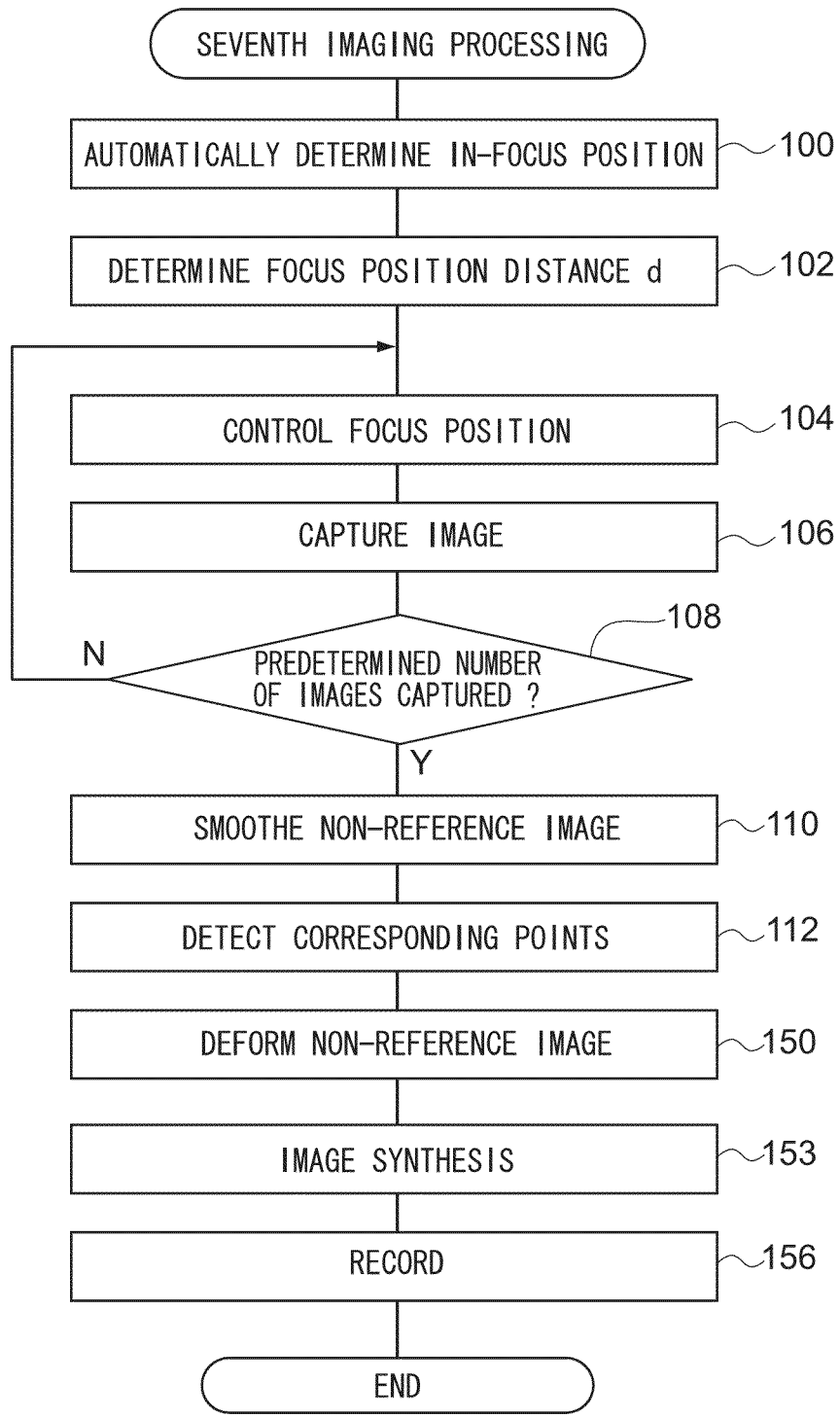

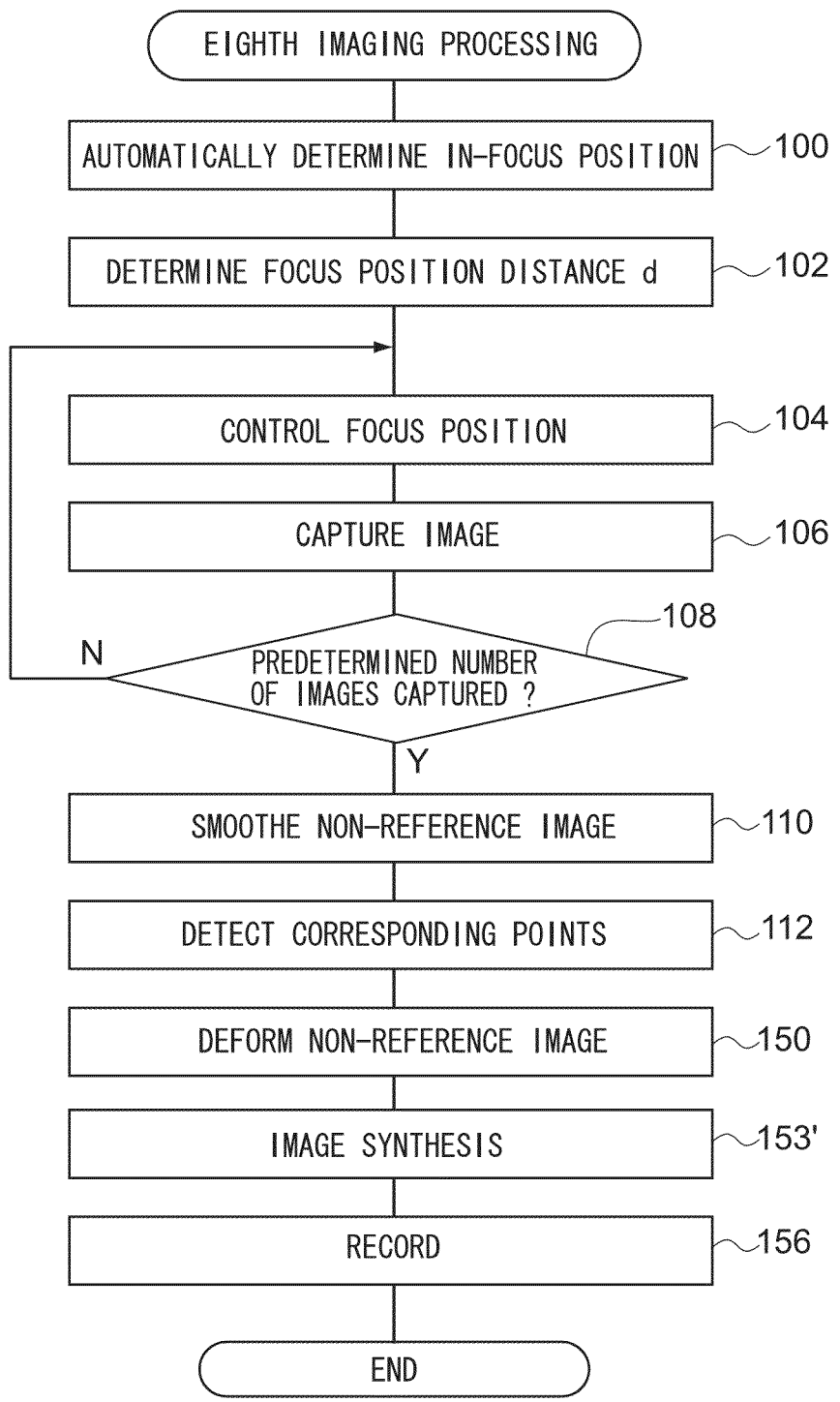

IMAGING DEVICE, METHOD AND COMPUTER READABLE MEDIUM FOR GENERATING A BLUR-ADJUSTED IMAGE ON THE BASIS OF A REFERENCE IMAGE AND A NON-REFERENCE IMAGE

CROSS-REFERENCE TO RELATED APPLICATIONS

This application is a continuation of PCT International Application No. PCT/JP2011/078951 filed Dec. 14, 2011 which claims priority under 35 U.S.C. 119(a) to application No. 2011-080034 filed Mar. 31, 2011 in Japan, all of which are hereby expressly incorporated by reference into the present application.

TECHNICAL FIELD

The present invention relates to an imaging device, an imaging method and a computer readable medium storing a program, and particularly relates to an imaging device having a function that performs focus bracket imaging, and an imaging method and a computer readable medium storing a program to be executed at this imaging device.

BACKGROUND ART

In recent years, as the resolutions of solid-state imaging components such as charge coupled device (CCD) area sensors, complementary metal oxide semiconductor (CMOS) image sensors and the like have risen, the demand for information systems with imaging functions such as digital electronic still cameras, digital video cameras, portable telephones, personal digital assistants (PDAs, which are portable information terminals) and the like has been rapidly increasing. The above-mentioned information devices with imaging functions are referred to herein as "imaging devices".

Heretofore, by processing that synthesizes plural images captured by focus bracket imaging, in which successive images are captured with the focus position being altered, it has become possible to obtain an image in which blurring is controlled or a fully focused image in which the whole of the image is in focus or the like. However, in this synthesis processing, the degree of correlation between images used in the processing may fall if there is blurring due to hand movement and/or blurring due to subject movement between the successive image captures, and an intended image may not be obtained.

As a technology for solving this problem, Patent Document 1 (Japanese Patent Application Laid-Open (JP-A) No. 2008-271240) discloses an imaging device that is provided with a focus bracket imaging unit, a corresponding point detection unit, an image deformation unit, an image synthesis unit and a recording unit. The focus bracket imaging unit obtains plural images by moving a focus point discretely in pre-specified movement amounts and capturing successive images. The corresponding point detection unit detects corresponding points of subjects in the plural images captured by the focus bracket imaging unit. The image deformation unit deforms the plural images, except for a single reference image selected from the plural images by a predetermined criterion, such that the positions of the corresponding points in the plural images match up with the reference image. The image synthesis unit synthesizes the plural images, including the deformed images. The recording unit records an image obtained by the image synthesis unit at a recording medium.

SUMMARY OF INVENTION

Technical Problem

However, because the plural images obtained by the focus bracket imaging unit in the technology disclosed in Patent Document 1 (JP-A No. 2008-271240) have different focus positions from one another, degrees of blurring in the respective images are different. As a result, the detection of the corresponding points is often unsuccessful. This phenomenon is particularly significant in cases of macro imaging and suchlike.

According to aspects of the present invention, an imaging device, an imaging method and a computer readable medium storing a program are provided that may suppress misdetections when corresponding points in plural images obtained by focus bracket imaging are being detected.

Solution to Problem

According to a first aspect of the present invention, an imaging device is provided that includes: an imaging unit that acquires plural images including an image in which at least a main subject is in focus, by discretely moving a focus position and successively capturing each of the plural images; an image processing unit that executes image processing with respect to at least one of a reference image or a non-reference image other than the reference image, to bring degrees of blur of the reference image and the non-reference image closer to one another, the reference image being an image in which the main subject is in focus among the plural images acquired by the imaging unit; a detection unit that detects corresponding points of a subject in the reference image and the non-reference image, subsequent to execution of the image processing by the image processing unit; a deformation unit that deforms the non-reference image before execution of the image processing by the image processing unit such that positions of the corresponding points detected by the detection unit coincide; a generation unit that generates a blur-adjusted image on the basis of the reference image and the non-reference image that is deformed by the deformation unit; and a recording unit that records the blur-adjusted image generated by the generation unit at a recording medium.

According to the imaging device in accordance with the first aspect of the present invention, plural images including an image in which at least a main subject is in focus are obtained by the imaging unit, with the focus position being moved in discrete amounts and successive images being captured (focus bracket imaging).

According to the first aspect of the present invention, the image processing unit executes image processing to at least one of a reference image or a non-reference image that is not the reference image, to bring degrees of blurring in the reference image and the non-reference image closer together, the reference image being the image in which the main subject is in focus among the plural images obtained by the imaging unit. The detection unit detects corresponding points of subjects between the reference image and the non-reference image subsequent to the execution of the image processing by the image processing unit.

Then, according to the first aspect of the present invention, the deformation unit deforms the non-reference image prior to the execution of image processing by the image processing unit such that the positions of the corresponding points detected by the detection unit match up. The generation unit generates the blur-adjusted image on the basis of the reference image and the non-reference image deformed by the deformation unit. The recording unit records the blur-adjusted image generated by the generation unit to the recording medium.

Thus, according to the imaging device in accordance with the first aspect of the present invention, plural images including an image in which at least a main subject is in focus are obtained by a focus position being discretely moved and successive images being captured, the image in which the main subject is in focus among the plural images is used as a reference image, image processing is executed to one or both of the reference image and a non-reference image other than the reference image to bring degrees of blurring between the reference image and the non-reference image closer together, and corresponding points in the reference image and the non-reference image subsequent to the execution of the image processing are detected. Therefore, misdetections when corresponding points in the plural images obtained by focus bracket imaging are being detected may be suppressed.

According to a second aspect of the present invention, in the first aspect, the image processing unit may execute at least one of smoothing processing or sharpening processing as the image processing. Thus, misdetections when corresponding points in plural images obtained by focus bracket imaging are being detected may be suppressed by smoothing processing and sharpening processing, which are relatively simple kinds of processing.

In particular, according to a third aspect of the present invention, in the second aspect, the image processing unit may execute the at least one of smoothing processing or sharpening processing by filter processing with a pre-specified first filter characteristic. Thus, misdetections when corresponding points in plural images obtained by focus bracket imaging are being detected may be suppressed by filter processing, which is a relatively simple kind of processing.

According to a fourth aspect of the present invention, in the third aspect, the first filter characteristic may be pre-specified on the basis of the focus positions when the reference image and the non-reference image are captured. Thus, misdetections when corresponding points in plural images obtained by focus bracket imaging are being detected may be suppressed without an additional unit being required.

According to a fifth aspect of the present invention, any of the first to fourth aspects may further include a specification unit that specifies, in an image acquired by the imaging by the imaging unit, a main subject region and a non-main subject region which is a subject region excluding the main subject region, wherein the image processing unit executes the image processing with respect to whichever of the main subject region or the non-main subject region specified by the specification unit has the larger area. Therefore, a greater number of corresponding points may be detected, as a result of which a higher quality blur-adjusted image may be obtained.

According to a sixth aspect of the present invention, any of the first to fourth aspects may further include a specification unit that specifies, in an image acquired by the imaging by the imaging unit, a main subject region and a non-main subject region which is a subject region excluding the main subject region, wherein, if the image processing includes smoothing processing, the image processing unit executes the smoothing processing to both the main subject region of the reference image and the non-main subject region of the non-reference image, and if the image processing includes sharpening processing, the image processing unit executes the sharpening processing to both the non-main subject region of the reference image and the main subject region of the non-reference image. Thus, a greater number of corresponding points may be detected, as a result of which a higher quality blur-adjusted image may be obtained.

According to a seventh aspect of the present invention, any of the first to sixth aspects may further include a calculation unit that calculates a blur application amount corresponding to coordinates of a pixel from some of the plural images which include the non-reference image deformed by the deformation unit, wherein the generation unit determines a second filter characteristic on the basis of a calculation result by the calculation unit, and generates the blur-adjusted image by executing filter processing with the determined filter characteristic to the reference image. Thus, filter processing may be executed in pixel units, as a result of which a higher quality blur-adjusted image may be obtained.

According to an eighth aspect of the present invention, in the seventh aspect, the second filter characteristic may be pre-specified on the basis of focus positions when the reference image and the non-reference image are captured. Thus, a higher quality blur-adjusted image may be obtained simply, without an additional unit being required.

According to a ninth aspect of the present invention, in any of the first to sixth aspects, the generation unit may generate the blur-adjusted image by synthesizing the reference image with the non-reference image deformed by the deformation unit. Thus, the blur-adjusted image may be generated more simply than in a case in which a blur-adjusted image is generated by executing filter processing to a reference image.

According to a tenth aspect of the present invention, in any of the first to ninth aspects, the generation unit may generate the blur-adjusted image such that a degree of blur of a non-main subject region is larger than a degree of blur of a main subject region.

According to an eleventh aspect of the present invention, an imaging method is provided that includes: an imaging step of acquiring plural images including an image in which at least a main subject is in focus, by discretely moving a focus position and successively capturing each of the plural images; an image processing step of executing image processing with respect to at least one of the reference image or a non-reference image other than the reference image to bring degrees of blur of the reference image and the non-reference image closer to one another, the reference image being an image in which the main subject is in focus among the plural images acquired by the imaging step; a detecting step of detecting corresponding points of a subject in the reference image and the non-reference image subsequent to execution of the image processing by the image processing step; a deforming step of deforming the non-reference image before the execution of the image processing by the image processing step such that positions of the corresponding points detected by the detecting step coincide; a generating step of generating a blur-adjusted image on the basis of the reference image and the non-reference image that is deformed by the deforming step; and a recording step of recording the blur-adjusted image generated by the generating step at a recording medium.

Thus, the eleventh aspect of the present invention operates in a similar manner to the first aspect of the invention. Therefore, the same as in the first aspect of the invention, misdetections when corresponding points in plural images obtained by focus bracket imaging are being detected may be suppressed.

According to a twelfth aspect of the present invention, a computer readable medium storing a program is provided that is executed for causing a computer to function as: an imaging unit that acquires plural images including an image in which at least a main subject is in focus, by discretely moving a focus position and successively capturing each of the plural images; an image processing unit that executes image processing to at least one of the reference image or a non-reference image other than the reference image to bring degrees of blur of the reference image and the non-reference image closer to one another, the reference image being the image in which the main subject is in focus among the plural images acquired by the imaging unit; a detection unit that detects corresponding points of a subject in the reference image and the non-reference image subsequent to an execution of the image processing by the image processing unit; a deformation unit that deforms the non-reference image before execution of the image processing by the image processing unit such that the positions of the corresponding points detected by the detection unit coincide; a generation unit that generates a blur-adjusted image on the basis of the reference image and the non-reference image that is deformed by the deformation unit; and a recording unit that records the blur-adjusted image generated by the generation unit at a recording medium.

Thus, according to the twelfth aspect of the present invention, a computer may be caused to operate in a similar manner to the first aspect of the invention. Therefore, the same as in the first aspect of the invention, misdetections when corresponding points in plural images obtained by focus bracket imaging are being detected may be suppressed.

Advantageous Effects of Invention

According to the aspects of the present invention, plural images including an image in which at least a main subject is in focus are obtained by a focus position being discretely moved and successive images being captured, the image among the plural images in which the main subject is in focus is used as a reference image, image processing is executed to at least one of the reference image or a non-reference image which is not the reference image to bring degrees of blurring in the reference image and the non-reference image closer together, and corresponding points in the reference image and the non-reference image after the execution of the image processing are detected. Therefore, misdetections when corresponding points in the plural images obtained by focus bracket imaging are being detected may be suppressed.

BRIEF DESCRIPTION OF DRAWINGS

FIG. 6 is a diagram showing a filter matrix of a Laplacian filter in accordance with the exemplary embodiment.

FIG. 8 is a schematic diagram for describing processing details of the first imaging processing program in accordance with the first exemplary embodiment.

FIG. 11 is a flowchart showing the flow of processing of a third imaging processing program in accordance with a third exemplary embodiment.

FIG. 12 is a schematic diagram for describing simple composition analysis in the digital camera in accordance with the third exemplary embodiment.

FIG. 13 is a flowchart showing the flow of processing of a fourth imaging processing program in accordance with a fourth exemplary embodiment.

FIG. 14 is a schematic diagram for describing processing details of the fourth imaging processing program in accordance with the fourth exemplary embodiment.

FIG. 15 is a flowchart showing the flow of processing of a fifth imaging processing program in accordance with a fifth exemplary embodiment.

FIG. 17 is a flowchart showing the flow of processing of a seventh imaging processing program in accordance with a seventh exemplary embodiment.

FIG. 18 is a flowchart showing the flow of processing of an eighth imaging processing program in accordance with an eighth exemplary embodiment.

DESCRIPTION OF EMBODIMENTS

Herebelow, embodiments for carrying out the present invention are described in detail with reference to the attached drawings. Herein, a case is described in which the present invention is applied to a digital electronic still camera (hereinafter referred to as a "digital camera") that captures still images.

First Exemplary Embodiment

Now, principal structures of an electronic system of a digital camera 10 in accordance with the present exemplary embodiment are described with reference to FIG. 1.

Figure 1:
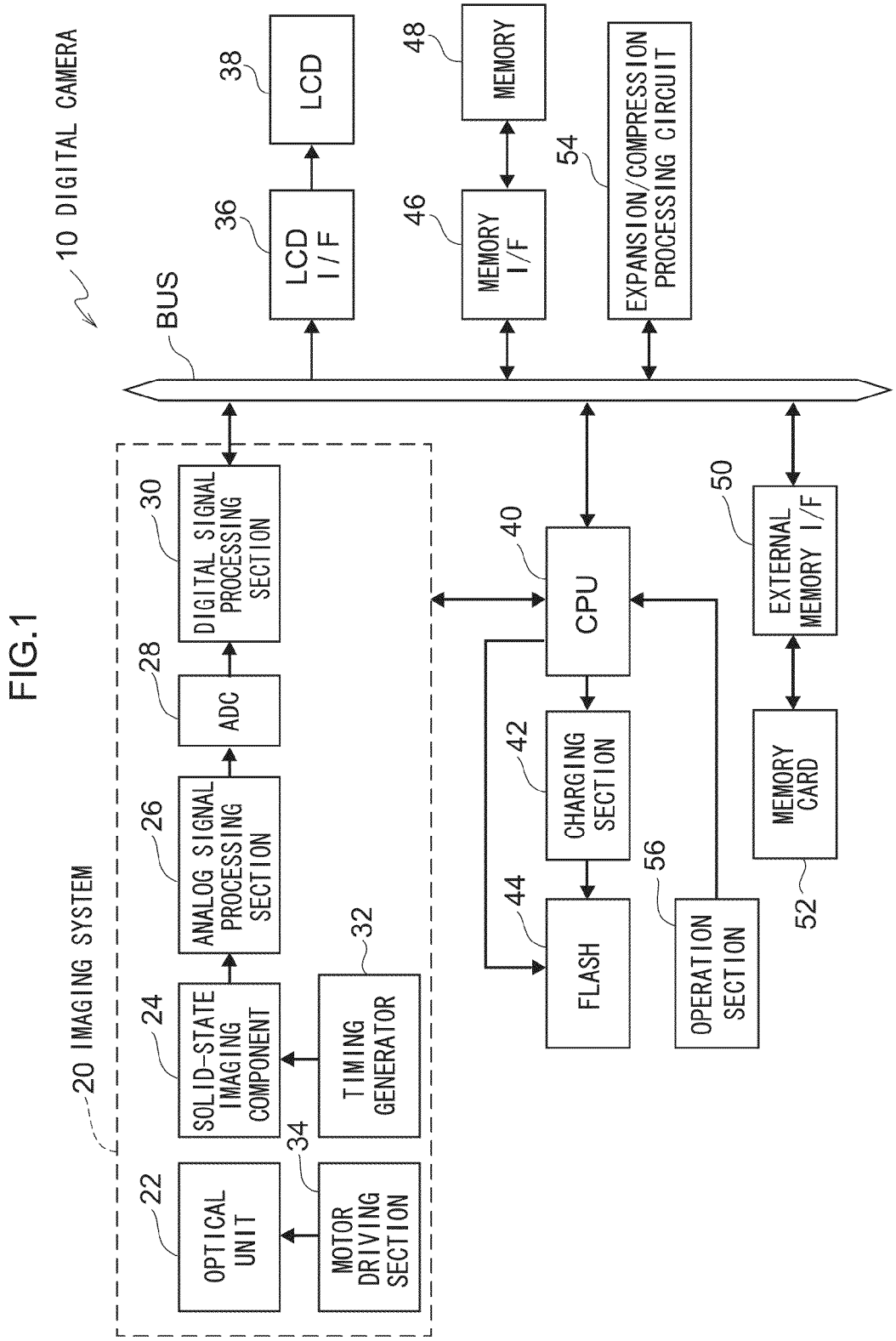
FIG. 1 is a block diagram showing the principal structures of an electronic system of a digital camera in accordance with an exemplary embodiment.

As shown in FIG. 1, the digital camera 10 according to the present exemplary embodiment includes an optical unit 22, a solid-state imaging component 24 and an analog signal processing section 26. The optical unit 22 includes a lens for focusing a subject image. The solid-state imaging component 24 is disposed on an optical axis of the lens, to rearward of the lens. The analog signal processing section 26 executes various kinds of analog signal processing to inputted analog signals. This imaging system 20 corresponds to an imaging unit.

The digital camera 10 further includes an analog/digital converter (hereinafter referred to as an "ADC") 28 and a digital signal processing section 30. The ADC 28 converts inputted analog signals to digital data. The digital signal processing section 30 executes various kinds of digital signal processing to inputted digital data.

The digital signal processing section 30 incorporates a line buffer with a predetermined capacity, and performs control to directly store inputted digital data in a predetermined region of a memory 48, which is described below.

An output terminal of the solid-state imaging component 24 is connected to an input terminal of the analog signal processing section 26, an output terminal of the analog signal processing section 26 is connected to an input terminal of the ADC 28, and an output terminal of the ADC 28 is connected to an input terminal of the digital signal processing section 30. Thus, analog signals representing a subject image that are outputted from the solid-state imaging component 24 are subjected to predetermined analog signal processing by the analog signal processing section 26, converted to digital image data by the ADC 28, and then inputted to the digital signal processing section 30.

The digital camera 10 also includes a liquid crystal display (hereinafter referred to as an "LCD") 38, an LCD interface 36, a central processing unit (CPU) 40, the memory 48, and a memory interface 46. The LCD 38 displays captured subject images, menu screens and suchlike. The LCD interface 36 generates signals for displaying the subject images, menu screens and suchlike at the LCD 38, and supplies these signals to the LCD 38. The CPU 40 administers overall operations of the digital camera 10. The memory 48 temporarily stores digital image data obtained by imaging and the like. The memory interface 46 controls access to the memory 48. Herein, the CPU 40 corresponds to an image processing unit, a detection unit, a deformation unit, a generation unit, a recording unit, a specification unit and a calculation unit.

The digital camera 10 further includes an external memory interface 50 and an expansion/compression processing circuit 54. The external memory interface 50 is for enabling access by the digital camera 10 to a portable memory card 52. The expansion/compression processing circuit 54 executes compression processing and expansion processing to digital image data.

In the digital camera 10 according to the present exemplary embodiment, a Flash Memory is used as the memory 48, and an xD Picture Card (registered trademark) is used as the memory card 52. It will be clear that these are not limitations.

The digital signal processing section 30, the LCD interface 36, the CPU 40, the memory interface 46, the external memory interface 50 and the expansion/compression processing circuit 54 are connected to one another via a system bus. Accordingly, the CPU 40 may control operations of the digital signal processing section 30 and the expansion/compression processing circuit 54, may display various kinds of information at the LCD 38 via the LCD interface 36, and may access the memory 48 and the memory card 52 via the memory interface 46 and the external memory interface 50.

The digital camera 10 is provided with a timing generator 32 that generates timing signals (pulse signals) principally for driving the solid-state imaging component 24 and supplies the timing signals to the solid-state imaging component 24. Driving of the solid-state imaging component 24 is controlled by the CPU 40 via the timing generator 32.

The digital camera 10 is further provided with a motor driving section 34. Driving of a focus adjustment motor, a zoom motor and an aperture driving motor provided at the optical unit 22, which are not shown in the drawings, is controlled by the CPU 40 via the motor driving section 34.

That is, the above-mentioned lens according to the present exemplary embodiment is structured as a zoom lens system including a plural number of lenses, in which a focus distance may be altered (zoom), and is provided with a lens driving mechanism which is not shown in the drawings. This lens driving mechanism includes the above-mentioned focus adjustment motor, zoom motor and aperture driving motor. These motors are respectively driven by driving signals provided from the motor driving section 34 under the control of the CPU 40.

The digital camera 10 is provided with an operation section 56, which includes various switches such as: a release switch that is pressed and operated when imaging is to be executed (a "shutter button"); a power switch that is operated when a power supply of the digital camera 10 is to be switched on or off; a mode switching switch that is operated when a mode is to be set to one of an imaging mode, which is a mode in which images are captured, and a replay mode, which is a mode in which subject images are replayed at the LCD 38; a menu switch that is pressed and operated when a menu screen is to be displayed at the LCD 38; a set switch that is pressed and operated to confirm the effects of previous operations; and a cancel switch that is pressed and operated when the effect of a preceding operation is to be cancelled. The operation section 56 is connected to the CPU 40. Thus, the CPU 40 may acquire operation states of the operation section 56 at any time.

The release switch of the digital camera 10 according to the present exemplary embodiment is structured to be capable of detecting a two-stage pressing operation: a state in which the release switch is pressed to an intermediate position (hereinafter referred to as a "half-pressed state"), and a state in which the release switch is pressed beyond the intermediate position to a completely pressed position (hereinafter referred to as a "fully pressed state").

In the digital camera 10, when the release switch is put into the half-pressed state, an automatic exposure (AE) function is operated and exposure conditions (shutter speed and aperture conditions) are set, after which an autofocus (AF) function operates and controls focusing. Thereafter, exposure (imaging) is carried out when the release switch goes on to be put into the fully pressed state.

The digital camera 10 is further provided with a flash 44 and a charging section 42. The flash 44 emits light which is illuminated onto a subject as required at times of imaging. The charging section 42 is interposed between the flash 44 and the CPU 40 and charges the flash 44 up with electrical power for emitting light, under the control of the CPU 40. The flash 44 is connected to the CPU 40, and light emission by the flash 44 is controlled by the CPU 40.

The digital camera 10 according to the present exemplary embodiment incorporates a focus bracket imaging function that, by moving the focus position in discrete amounts and capturing successive images, acquires a plural number of images including an image in which at least a main subject is in focus. On the basis of the plural images, the focus bracket imaging function generates and records a blur-adjusted image in which a degree of blurring is adjusted in a region (hereinafter referred to as "the non-main subject region") that is not a region of the main subject (hereinafter referred to as "the main subject region").

According to the present exemplary embodiment, in the digital camera 10, the focus bracket imaging described above is carried out and the blur-adjusted image is generated and recorded at the memory card 52 only if operation of the focus bracket imaging function has been set by a user via the operation section 56.

Figure 2:
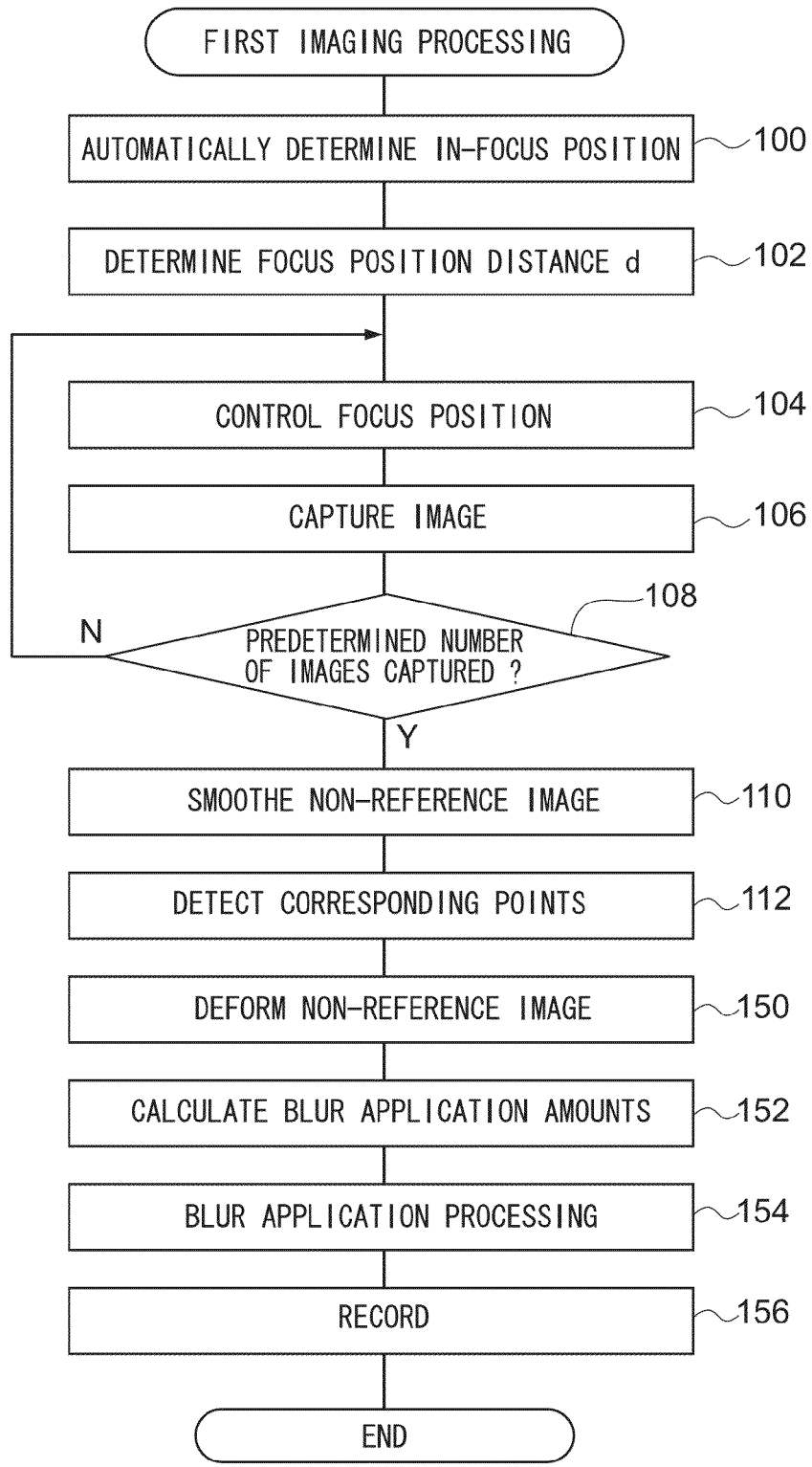
FIG. 2 is a flowchart showing the flow of processing of a first imaging processing program in accordance with a first exemplary embodiment.

Now, operations of the digital camera 10 in accordance with the present exemplary embodiment are described with reference to FIG. 2. FIG. 2 is a flowchart showing the flow of processing of a first imaging processing program which is executed by the CPU 40 of the digital camera 10 when the release switch of the operation section 56 passes through the half-pressed state and transitions to the fully pressed state. This program is stored in advance in a predetermined region of the memory 48. To avoid complexity, a case in which operation of the focus bracket imaging function has been caused to operate by a user is described.

In step 100 of FIG. 2, the in-focus position for a main subject is automatically determined by operation of the AF function. Then, in step 102, a focus position interval d is determined.

In the present exemplary embodiment, focus positions to be set during the focus bracket imaging are specified to include the in-focus position of the main subject and focus positions in front of and behind the main subject. As illustrated in the example in FIG. 3, there are a total of five focus positions when this focus bracket imaging is performed: the main subject focus position F3; focus positions F2 and F4 that are spaced forward and behind the focus position of the main subject by the focus position interval d; and focus positions F1 and F5 which are separated from the focus positions F2 and F4 by the focusing point interval d in directions away from the main subject focusing point F3. In order from an end focus position, an identification number of the image captured at F1 is "1", the identification number of the image captured at F2 is "2", ..., and the identification number of the image captured at F5 is "5".

In the digital camera 10 according to the present exemplary embodiment, in a case in which the F-value of the aperture is small, a case in which the focus distance is long or the like, or a case in which the subject field depth is shallow, d is set to be small. Conversely, in a case in which the F-value of the aperture is large, a case in which the focus distance is short or the like, or a case in which the subject field depth is large, d is set to be large. The CPU 40 determines the focusing point interval d on the basis of settings memorized in the memory 48. Thus, images with different focusing points applicable to blur emphasis may be obtained at arbitrary apertures and focus distances. Herein, the focus position interval d need not be fixed and may, for example, vary to the near side or the far side relative to the in-focus position of the main subject.

Figure 3:
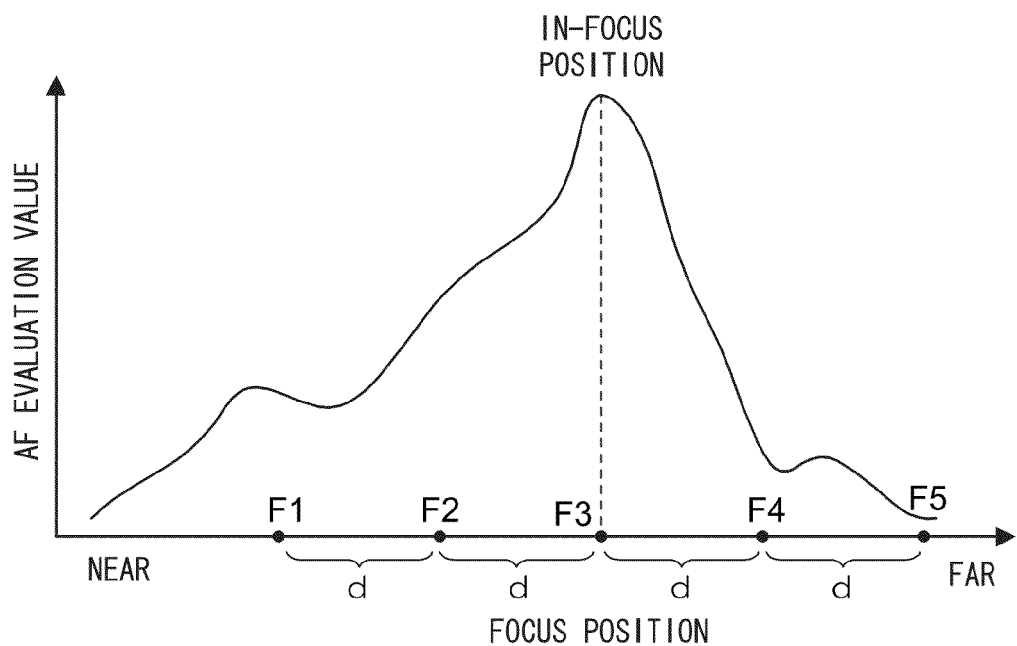
FIG. 3 is a diagram for describing focus bracket imaging in the digital camera in accordance with the exemplary embodiment, and is a graph illustrating a relationship between focus position and autofocus evaluation value.

In step 104, the focus position is controlled to be set to one of the plural focus positions obtained by the above-described processing of step 100 and step 102 in accordance with the in-focus position for the main subject and the focus position interval d (in the present exemplary embodiment, a focus position among the five positions F1 to F5 shown in FIG. 3). Then, in step 106, control is applied to carry out imaging.

In step 108, a determination is made as to whether the number of image captures has reached a pre-specified number (five images in the present exemplary embodiment). If the result of this determination is negative, the CPU 40 returns to step 104, and when the result of the determination is affirmative the CPU 40 proceeds to step 110. While the above-described processing from step 104 to step 108 is being repeatedly executed, in step 104 control is performed to set a focus position that has not yet been set among the above-described plural focus positions. Thus, focus bracket imaging is carried out by the repeated processing of step 104 to step 108, and the captured images that are obtained in this manner are saved to a predetermined region of the memory 48.

In step 110, of the captured images obtained by the above processing, the image in which the main subject is in focus is selected as a reference image, an image other than the reference image is selected as a non-reference image, and a degree of blur of the non-reference image is brought closer to a degree of blur of the reference image by smoothing processing being executed to the non-reference image with a smoothing filter.

In the digital camera 10 according to the present exemplary embodiment, quantities of blur application in the smoothing processing of the non-reference image are determined as follows.

Figure 4A:
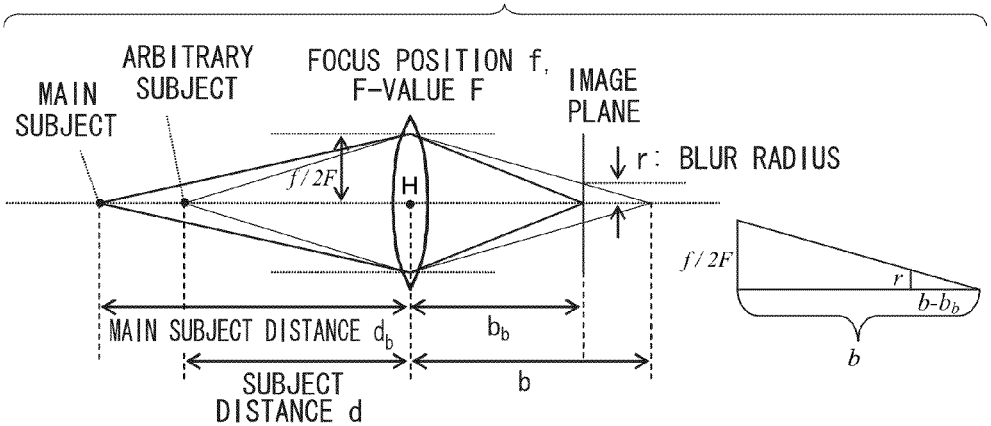
FIG. 4A is a schematic diagram for describing a blur application amount determination procedure in the digital camera in accordance with the exemplary embodiment.
Figure 4B:
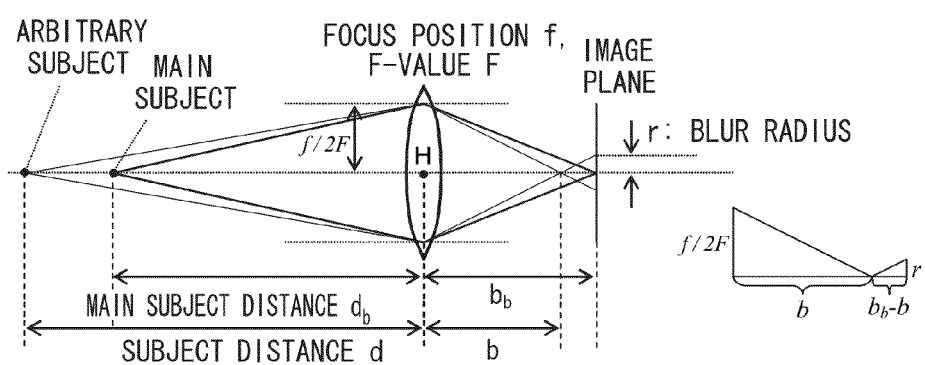
FIG. 4B is a schematic diagram for describing the blur application amount determination procedure in the digital camera in accordance with the exemplary embodiment.

As shown in FIG. 4A and FIG. 4B, using a lens with a focus distance off and an F-value of F, the image plane is positioned such that a main subject is in focus. A main subject distance (a distance from the main subject to the lens center H) is represented by $d_b$ (mm), and a distance between the focusing point of the main subject (the image plane) and the lens center H is represented by $b_b$ (mm). The subject distance of a subject at an arbitrary position is represented by d (mm), and the distance between the focusing point of this subject and the lens center H is represented by b (mm). Now, a relationship between the arbitrary subject's subject distance d (mm) and a blur radius r (mm) is considered. FIG. 4A shows the relationships if the arbitrary subject is closer than the main subject (near side: $d \leq d_b$), and FIG. 4B shows the relationships if the arbitrary subject is further than the main subject (far side: $d > d_b$).

From the lens formula, the following expressions (1) and (2) can be written.

$$\frac{1}{f} = \frac{1}{d} + \frac{1}{b} \tag{1}$$

$$\frac{1}{f} = \frac{1}{d_b} + \frac{1}{b_b} \tag{2}$$

From the relationships of analogous triangles formed at the image plane side, the following expressions (3) and (4) can be written.

$$r = \frac{f(b - b_b)}{2Fb} \text{ [mm] (NEAR side: } d \leq d_b) \tag{3}$$

$$r = \frac{f(b_b - b)}{2Fb} \text{ [mm] (FAR side: } d > d_b) \tag{4}$$

Based on the definition "F-value=focus distance/average diameter", the radius of the aperture is f/2F.

Combined, expression (3) and expression (4) can be represented by the following expression (5).

$$r = \frac{f|b-b_b|}{2Fb}[\text{mm}] \quad (5)$$

If expression (1) and expression (2) are solved for b and $b_b$, and substituted into expression (5), the following relationship between the arbitrary subject distance d and a blur radius r is obtained.

$$r = \frac{f}{2F} \cdot \frac{\left|\frac{1}{d} - \frac{1}{d_b}\right|}{\frac{1}{f} - \frac{1}{d_b}}[\text{mm}] \quad (6)$$

Assume that the in-focus subject distance is greater than the focus distance, that is, $d_b > f$ ($1/f > 1/d_b$). This blur radius r (mm) is an index of a degree of smoothing.

If a pixel pitch of the solid-state imaging component 24 is represented by "p" (μm), the blur radius r in pixel units $r_p$ is represented by the following expression (7).

$$r_p = \frac{1000 \times r}{p}[\text{pixel}] \quad (7)$$

Finally, a filter characteristic is determined on the basis of this blur radius. In the digital camera 10 according to the present exemplary embodiment, a Gaussian filter is employed as a smoothing filter, and the σ parameter of this Gaussian filter is calculated from the following expression (8).

$$\sigma = D \times r_p \quad (8)$$

Here, D is a constant for adjusting the degree of smoothing. To calculate filter coefficients f(x) from the σ parameter that is obtained, calculations are performed using the following expression (9), and normalization is applied such that the sum of the calculated filter coefficients comes to 1.

$$f(x) = \frac{1}{\sqrt{2\pi\sigma}} \exp\left(-\frac{x^2}{2\sigma^2}\right) \quad (9)$$

In the case of a digital filter, f(x) is found for each of discrete positions centered on a pixel of interest. For example, in a case of a five-tap filter, f(x)={0.1, 0.2, 0.4, 0.2, 0.1} or suchlike. Generally, these coefficients are normalized such that the sum of the coefficients comes to 1.0, so that the brightness of the image is not altered. Filter coefficients in one dimension are presented here, but filter processing in two dimensions may be performed by applying the filter successively in a horizontal direction and a vertical direction.

In this step 110, the non-reference image to which the smoothing processing has been executed is generated as a separate image from the non-reference image obtained by the focus bracket imaging.

Figure 5A:
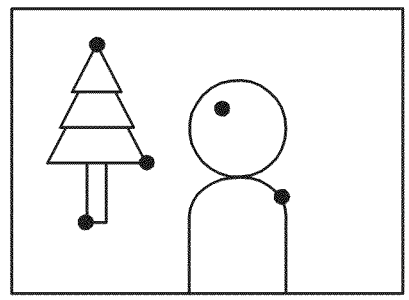
FIG. 5A is a schematic diagram for describing a characteristic point and corresponding point detection procedure in the digital camera in accordance with the exemplary embodiment.
Figure 5B:
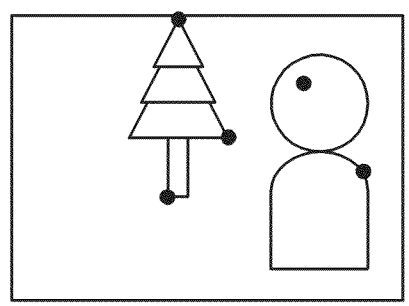
FIG. 5B is a schematic diagram for describing the characteristic point and corresponding point detection procedure in the digital camera in accordance with the exemplary embodiment.

In step 112, corresponding points in the reference image and each non-reference image to which smoothing processing has been executed by the processing of step 110 are detected. Herebelow, a procedure of detection of the corresponding points is described. The corresponding point detection finds positional associations between points that correspond between plural images. FIG. 5A and FIG. 5B are drawings showing an example of images obtained from focus bracket imaging. The digital camera 10 according to the present exemplary embodiment extracts characteristic points from the example of a reference image shown in FIG. 5A, and tracks what positions the characteristic points have moved to in the example of a tracking image shown in FIG. 5B. Thus, the corresponding points are detected.

First, the CPU 40 detects characteristic points in the reference image. Various techniques for extracting characteristic points have been proposed. In this case, if the standard deviation of luminances within a predetermined range centered on a certain point is greater than a predetermined value, then that point is extracted to serve as a characteristic point. The circles in FIG. 5A represent the characteristic points in the image of FIG. 5A. The more numerous the characteristic points, the more precisely the processing below may be carried out. However, because the processing load increases when there are more characteristic points, the number of characteristic points may be suitably determined in accordance with hardware characteristics and the like.

Then, the CPU 40 selects one of the non-reference images to serve as a tracking image, selects one characteristic point extracted from the reference image, and tracks to what position this characteristic point has moved in the tracking image. Various techniques for this tracking have been proposed. In this case, a technique of finding the coordinates of a point such that the cross-correlation function within a predetermined range centered on the point is minimized (block matching) is used to implement the tracking.

The above tracking of characteristic points in the reference image is executed for all the non-reference images. Thus, the processing for detection of corresponding points is completed.

Then, in step 150, each non-reference image from before the execution of the smoothing processing in step 110 (i.e., the non-reference image obtained by the focus bracket imaging) is deformed such that the corresponding points in the corresponding non-reference image that have been obtained by the processing of step 112 match as closely as possible to the positions of the corresponding points in the reference image.

In the digital camera 10 according to the present exemplary embodiment, this image deformation is implemented by translation, rotation and magnification/reduction processing of the non-reference image. For these image deformations, it is sufficient to determine a movement vector such that a sum of distances between the plural pairs of corresponding points is minimized The translation, rotation and magnification/reduction processing may be implemented by affine transformations.

In a case in which there are multiple movements between the reference image and the non-reference image, warping is applied to make all the corresponding points match more accurately. Warping is the selection of movement vectors such that all the pairs of corresponding points completely match, and then finding points around the corresponding points by interpolation.

In step 152, blur application amounts are calculated. A procedure for calculating each blur application amount is described below.

First, the CPU 40 calculates a degree of sharpness of each pixel in the reference image and in each non-reference image after the deformation by the processing of step 150.

Figure 6:
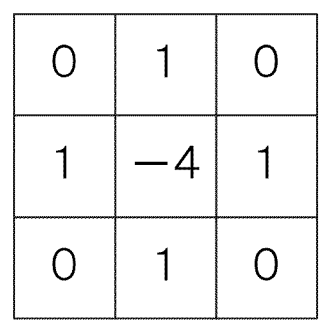

This calculation of sharpnesses is carried out by calculating absolute values of output values from Laplacian filter processing. FIG. 6 is a diagram illustrating a filter matrix of a Laplacian filter. Edge detection may be conducted by performing Laplacian filter processing, and the absolute values of output values thereof represent sharpnesses. The relationship between the blur of an image and sharpness is that pixels with smaller image blur have higher sharpness and pixels with greater blur have lower sharpness. The kernel of a Laplacian filter is not limiting in this example, and sharpness calculation filters other than a Laplacian filter may be used.

Then, for each pixel, the CPU 40 calculates a blur application amount k with the following expression (10), in which "n" represents the image identification number of the image in which the calculated sharpness is highest and "c" represents the image identification number of the reference image.

$$k = u \times (n - c) \tag{10}$$

In this expression, "u" represents a degree of blur emphasis designated by a user. If u is greater than 1.0, blur is to be emphasized more than in a standard setting, and if u is less than 1.0, blur is to be moderated compared to the standard setting. The degree of blur emphasis u may be specified by operation of the operation section 56 by a user. In the present exemplary embodiment, c is 3.

In step 154, blur application processing is executed to the reference image. In the digital camera 10 according to the present exemplary embodiment, a Gaussian filter is used for the blur application processing.

Firstly, the CPU 40 selects the blur application amount corresponding to a pixel from the blur application amounts k obtained by the processing of step 152, and compares the absolute value |k| of the blur application amount with a predetermined threshold Th. If the predetermined threshold Th is the larger, it is understood that this pixel is in an in-focus region and the pixel value captured at the focus position F3 is outputted. If the blur application amount absolute value |k| is the larger, it is understood that this pixel is in a region in which blur should be emphasized, and a filter coefficient is determined.

Figure 7A:
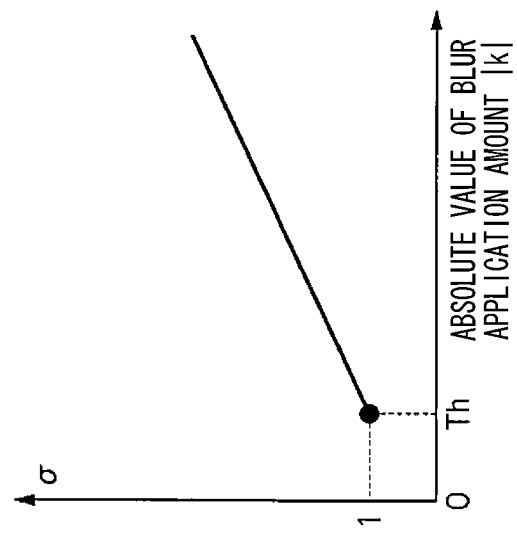
FIG. 7A is a graph showing a relationship between absolute value of a blur application amount and the σ parameter of a Gaussian filter in accordance with the exemplary embodiment.
Figure 7B:
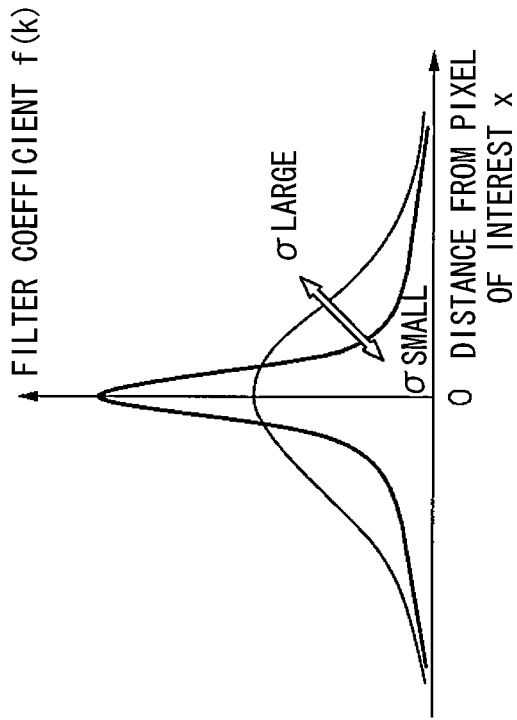
FIG. 7B is a graph showing a relationship between the absolute value of a blur application amount and the σ parameter of a Gaussian filter in accordance with the exemplary embodiment.

As mentioned above, in the digital camera 10 according to the present exemplary embodiment, a Gaussian filter is used for this filter processing. FIG. 7A and FIG. 7B are graphs showing relationships between the blur application amount absolute value |k| and a σ parameter of this Gaussian filter. As shown in FIG. 7A and FIG. 7B, if the blur application amount absolute value |k| is at least the predetermined threshold Th, a σ parameter of a Gaussian filter is found, which is proportional to the blur application amount absolute value |k|, and Gaussian filter coefficients f(x) corresponding to this σ parameter are determined. The CPU 40 determines the σ parameter on the basis of a relationship memorized in a predetermined region of the memory 48.

FIG. 7B is a graph showing the relationship between a distance x from the pixel of interest and the filter coefficient f(x) of the Gaussian filter. As illustrated in FIG. 7B, the Gaussian filter produces a weighted average with the weightings of neighboring pixels being larger when the σ parameter is larger. Therefore, by the σ parameter being made larger in accordance with the size of the blur application amount absolute value |k|, a degree of smoothing may be made larger when the blur application amount absolute value |k| is larger.

The filter coefficients f(x) are calculated by substituting the σ parameter that has been found into the aforementioned expression (9), and normalization is applied such that the sum of the filter coefficients comes to 1. Here too, filter coefficients in one dimension are presented but filter processing in two dimensions may be performed by applying the filter successively in a horizontal direction and a vertical direction.

As described above, degrees of blur in a region excluding the main subject region are adjusted by executing the filter processing to all pixels therein in accordance with the blur application amounts, and a blur-adjusted image is generated.

Thus, by executing the filter processing to the reference image captured at the main subject in-focus position, a more natural blur emphasis may be obtained. The filter that is used for this filter processing is not limited to being a Gaussian filter, and could as well be another filter that is a low-pass filter. For example, a filter with a form of blurring that corresponds to the aperture, a lens characteristic or the like may be used.

In step 156, the blur-adjusted image obtained by the processing of step 154 is compressed by the expansion/compression processing circuit 54 and then recorded to the memory card 52 via the external memory interface 50. Thereafter, this first imaging processing program ends.

As shown in the example in FIG. 8, the execution of the first imaging processing program described above first implements focus bracket imaging, obtaining a reference image in which a main subject is in focus and a non-reference image in which a region of background outside the region of the main subject is in focus. Then, the program executes smoothing processing to the non-reference image, bringing a degree of blur in the background region excluding the main subject in the non-reference image closer to that of the reference image.

Then, after characteristic points in the reference image are detected, corresponding points that correspond to the characteristic points are detected in the non-reference image to which the smoothing processing has been executed, and the non-reference image to which the smoothing processing has not been executed is deformed such that the detected corresponding points coincide with the characteristic points.

Then, blur application amounts for respective pixels are calculated on the basis of the respective sharpnesses of the pixels in the reference image and the deformed non-reference image. Finally, the background region of the reference image is blurred by the calculated blur application amounts to generate the blur-adjusted image, which is recorded to the memory card 52.

As is described in detail hereabove, according to the present exemplary embodiment, plural images including an image in which at least a main subject is in focus are obtained by the focus position being discretely moved and successive images being captured (the focus bracket imaging), the image among the plural images in which the main subject is in focus is used as the reference image, image processing (smoothing processing in the present exemplary embodiment) is executed to at least one of the reference image and a non-reference image that is not the reference image (to the non-reference image in the present exemplary embodiment) to bring degrees of blurring between the reference image and the non-reference image closer together, and corresponding points between the reference image and the non-reference image to which the image processing has been executed are detected. Therefore, misdetections when corresponding points in the plural images obtained by focus bracket imaging are being detected may be suppressed.

According to the present exemplary embodiment, the image processing that is executed is smoothing processing. Therefore, misdetections when corresponding points in the plural images obtained by focus bracket imaging are being detected may be suppressed with relatively simple processing.

In particular, according to the present exemplary embodiment, the smoothing processing is executed by filter processing in accordance with a first filter characteristic that is specified in advance. Therefore, misdetections when corresponding points in the plural images obtained by focus bracket imaging are being detected may be suppressed with filter processing, which is relatively simple processing.

Furthermore, according to the present exemplary embodiment, the first filter characteristic is pre-specified on the basis of focus positions when the reference image and the non-reference image are captured. Therefore, there is no need for an additional unit and misdetections when corresponding points in the plural images obtained by focus bracket imaging are being detected may be suppressed simply.

According to the present exemplary embodiment, the blur-adjusted image is generated by calculating a blur application amount corresponding to the coordinates of a pixel from plural images including the deformed non-reference image, determining a second filter characteristic on the basis of the result of this calculation, and executing filter processing with the determined second filter characteristic to the reference image. Therefore, filter processing may be executed in pixel units, as a result of which a higher quality blur-adjusted image may be obtained.

According to the present exemplary embodiment, the second filter characteristic is specified in advance on the basis of the focus positions when the reference image and the non-reference image are captured. Therefore, the higher quality blur-adjusted image may be obtained simply without an additional unit being required.

Second Exemplary Embodiment

Now, a second exemplary embodiment of the present invention is described in detail. Structures of the digital camera 10 according to the second exemplary embodiment are the same as in the digital camera 10 according to the first exemplary embodiment shown in FIG. 1, so are not described here.

Figure 9:
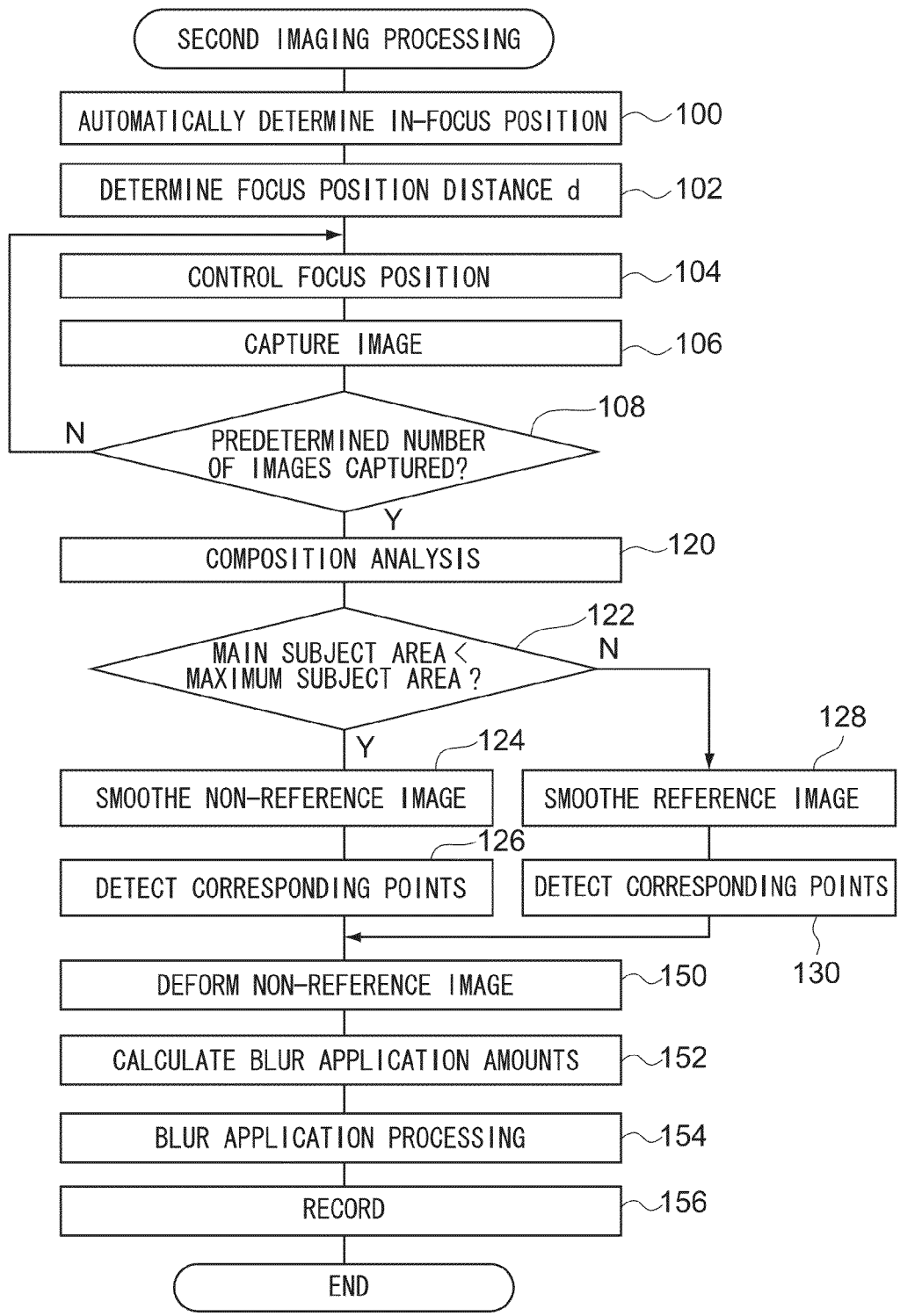
FIG. 9 is a flowchart showing the flow of processing of a second imaging processing program in accordance with a second exemplary embodiment.

Herebelow, operations of the digital camera 10 in accordance with this second exemplary embodiment are described with reference to FIG. 9. FIG. 9 is a flowchart showing a flow of processing of a second imaging processing program that is executed by the CPU 40 of the digital camera 10 according to this second exemplary embodiment when the release switch passes through the half-pressed state and transitions to the fully pressed state. Steps in FIG. 9 that execute processing the same as in FIG. 2 are assigned the same step numbers as in FIG. 2 and are not described. Here too, in order to avoid complexity, a case in which operation of the focus bracket imaging function has been caused to operate by a user is described.

In step 120 of FIG. 9, a composition analysis is carried out to specify the areas of a main subject region and a non-main subject region, which is a subject region other than the main subject region, in a captured image. The procedure of this composition analysis is described below.

In the digital camera 10 according to the present exemplary embodiment, the composition analysis is executed using information obtained by the AF function, which is executed when the release switch of the operation section 56 is half-pressed.

Figure 10A:
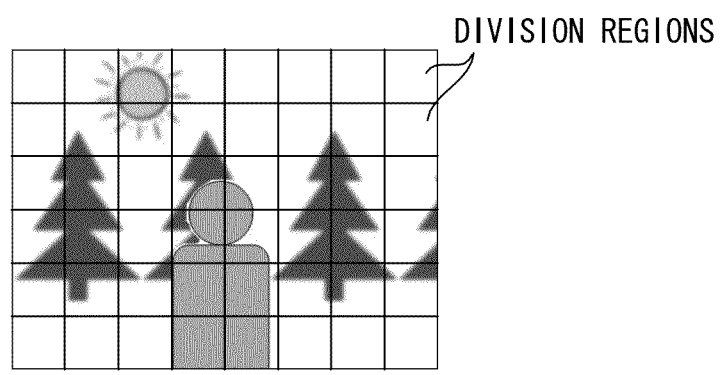
FIG. 10A is a schematic diagram for describing a procedure of specification of a main subject region and a non-main subject region in the digital camera in accordance with the second exemplary embodiment.

That is, in the digital camera 10 according to the present exemplary embodiment, the AF function operates when the release switch is put into the half-pressed state and, as illustrated by the example in FIG. 10A, respective in-focus positions are obtained for each of pre-specified division regions within the imaging field (in the present exemplary embodiment, a total of 48 division regions in eight columns by six rows).

Figure 10B:
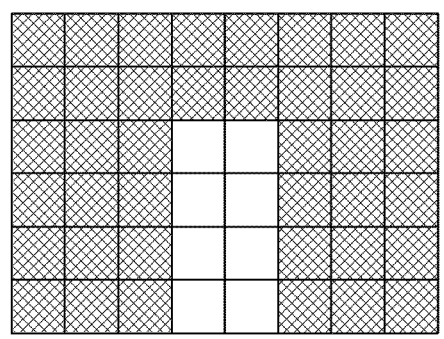
FIG. 10B is a schematic diagram for describing the procedure of specification of the main subject region and non-main subject region in the digital camera in accordance with the second exemplary embodiment.

If particular subjects are disposed at the same distance from the digital camera 10, it is to be expected that the focus positions of the division regions containing these subjects will be substantially the same. Therefore, in the composition analysis according to the present exemplary embodiment, a number of division regions whose in-focus positions are in a pre-specified range is considered to be the area of the subject. In the example shown in FIG. 10B, the number of division regions occupied by a person who is the main subject is eight, and the number of division regions occupied by the background is 40. Thus, the areas of the main subject region and the non-main subject region are specified by these numbers of division regions.

Then, in step 122, a determination is made as to whether the area of the main subject region provided by the processing of step 120 is smaller than a maximum area of the non-main subject region. If the result of this determination is affirmative, the CPU 40 proceeds to step 124.

In step 124, similarly to the processing of steps 110 and 112 of the first imaging processing program according to the first exemplary embodiment, the degree of blurring of the non-reference image is brought closer to a degree of blurring of the reference image by executing smoothing processing with a smoothing filter to the non-reference image. Thereafter, in step 126, corresponding points in the reference image and the non-reference image to which smoothing processing has been executed by the processing of step 124 are detected, after which the CPU 40 proceeds to step 150.

Alternatively, if the result of the determination in step 122 is negative, the CPU 40 proceeds to step 128 and brings the degree of blurring of the reference image closer to the degree of blurring of the non-reference image by executing smoothing processing with a smoothing filter to the reference image. Thereafter, in step 130, corresponding points between the reference image to which smoothing processing has been executed by the processing of step 128 and the non-reference image are detected, after which the CPU 40 proceeds to step 150.

As is described in detail hereabove, according to the present exemplary embodiment, substantially the same effects as in the above-described first exemplary embodiment may be realized. In addition, a main subject region and a non-main subject region that is a subject region excluding the main subject region are specified in the images obtained by the focus bracket imaging, and the image processing is executed to whichever of the specified main subject region and non-main subject region has a larger area. Therefore, a greater number of corresponding points may be detected, as a result of which a higher quality blur-adjusted image may be obtained.

Third Exemplary Embodiment

Now, a third exemplary embodiment of the present invention is described in detail. Structures of the digital camera 10 according to the third exemplary embodiment are the same as in the digital camera 10 according to the first exemplary embodiment shown in FIG. 1, so are not described here.

Herebelow, operations of the digital camera 10 in accordance with this third exemplary embodiment are described with reference to FIG. 11. FIG. 11 is a flowchart showing a flow of processing of a third imaging processing program that is executed by the CPU 40 of the digital camera 10 according to this third exemplary embodiment when the release switch passes through the half-pressed state and transitions to the fully pressed state. Steps in FIG. 11 that execute processing the same as in FIG. 2 are assigned the same step numbers as in FIG. 2 and are not described. Here too, in order to avoid complexity, a case in which operation of the focus bracket imaging function has been caused to operate by a user is described. Here too, in order to avoid complexity, a case in which operation of the focus bracket imaging function has been caused to operate by a user is described.

In step 140 of FIG. 11, a simple composition analysis is carried out to specify the areas of a main subject region and a non-main subject region, which is a subject region other than the main subject region, in a captured image.

In the digital camera 10 according to the present exemplary embodiment, similarly to the composition analysis of the digital camera 10 according to the above-described second exemplary embodiment, the simple composition analysis is executed using information obtained by the AF function that is executed when the release switch of the operation section 56 is half-pressed.

Specifically, in the simple composition analysis according to the present exemplary embodiment, division regions that correspond with the focus position of a division region disposed at a central portion of the field of view or have focus positions within a pre-specified range are specified as the main subject region, and other regions are specified as the non-main subject region.

In the simple composition analysis according to the present exemplary embodiment, the focus position obtained when the release switch was half-pressed is used. Therefore, as shown in the example in FIG. 12, the main subject region and non-main subject region obtained by this simple composition analysis are slightly offset in position from the respective regions when the focus bracket imaging is actually performed.

Accordingly, in step 142, processing is executed to correct the main subject region and non-main subject region specified by the processing of step 140 in accordance with this offset. Herebelow, a procedure of this correction processing is described with reference to FIG. 12.

Firstly, corresponding points are detected by a procedure the same as the procedure described above, between an image obtained when the AF function is operated for obtaining the focus positions used in the simple composition analysis (hereinafter referred to as the "AF image") and the reference image obtained by the focus bracket imaging. Then, distances between the corresponding pairs of detected corresponding points and movement directions of the same, from the AF image to the reference image, are specified. On the basis of the specified corresponding point distances and movement directions, a boundary between the main subject region and non-main subject region obtained by the processing of step 140 is moved in the movement directions corresponding to the nearest corresponding points in the AF image by the corresponding distances.

Then, in step 144, smoothing processing with a smoothing filter is executed to the main subject region of the reference image that has been corrected by the processing of step 142. Thus, the degree of blur of the main subject region in the reference image is brought closer to the degree of blur of the main subject region in a non-reference image. Then, in step 144, smoothing processing with a smoothing filter is executed to the non-main subject region of the non-reference image that has been corrected by the processing of step 142. Thus, the degree of blur of the non-main subject region in the non-reference image is brought closer to the degree of blur of the non-main subject region in the reference image.

In step 148, corresponding points in the reference image and non-reference image to which smoothing processing has been executed by the processing described above are detected in the same manner as in the processing of step 112 of the first imaging processing program according to the above-described first exemplary embodiment.

As is described in detail hereabove, according to the present exemplary embodiment, substantially the same effects as in the above-described first exemplary embodiment may be realized. In addition, a main subject region and a non-main subject region that is a subject region excluding the main subject region are specified in images obtained by imaging, and the image processing is executed to both the main subject region of the reference image and the non-main subject region of the non-reference image, to bring the degrees of blur of the reference image and the non-reference image closer to one another. Thus, a greater number of corresponding points may be detected, as a result of which a higher quality blur-adjusted image may be obtained.

Fourth Exemplary Embodiment

Now, a fourth exemplary embodiment of the present invention is described in detail. Structures of the digital camera 10 according to the fourth exemplary embodiment are the same as in the digital camera 10 according to the first exemplary embodiment shown in FIG. 1, so are not described here.

Herebelow, operations of the digital camera 10 in accordance with this fourth exemplary embodiment are described with reference to FIG. 13. FIG. 13 is a flowchart showing a flow of processing of a fourth imaging processing program that is executed by the CPU 40 of the digital camera 10 according to this fourth exemplary embodiment when the release switch passes through the half-pressed state and transitions to the fully pressed state. Steps in FIG. 13 that execute processing the same as in FIG. 2 are assigned the same step numbers as in FIG. 2 and are not described. Here too, in order to avoid complexity, a case in which operation of the focus bracket imaging function has been caused to operate by a user is described.

In step 110' of FIG. 13, reconstruction processing with a reconstruction filter is executed to the reference image among the captured images provided by the focus bracket imaging. Thus, a degree of blur (or sharpness) of the reference image is brought closer to a degree of blur (sharpness) of a non-reference image.

In the digital camera 10 according to the present exemplary embodiment, an inverse filter of the smoothing filter according to the first exemplary embodiment is employed as this reconstruction filter. Filter coefficients of the smoothing filter may be derived in the same manner as in the first exemplary embodiment.

As shown in the example in FIG. 14, the execution of the fourth imaging processing program first implements focus bracket imaging, providing a reference image in which the region of a main subject is in focus and a non-reference image in which a region of the background excluding the region of the main subject is in focus. Then reconstruction processing is executed to the reference image, bringing the degree of blur of the background region in the reference image closer to that in the non-reference image.

Then, after characteristic points in the reference image are detected, corresponding points that correspond to the characteristic points are detected in the non-reference image, and the non-reference image is deformed such that the detected corresponding points coincide with the characteristic points. Then, the blur application amounts for respective pixels are calculated on the basis of sharpnesses of the respective pixels in the reference image and the non-reference image. Finally, the background region of the reference image is blurred by the calculated blur application amounts to generate the blur-adjusted image, which is recorded to the memory card 52.

In the present embodiment too, the same effects as in the first exemplary embodiment described above may be provided.

Fifth Exemplary Embodiment

Now, a fifth exemplary embodiment of the present invention is described in detail. Structures of the digital camera 10 according to the fifth exemplary embodiment are the same as in the digital camera 10 according to the first exemplary embodiment shown in FIG. 1, so are not described here.

Herebelow, operations of the digital camera 10 in accordance with this fifth exemplary embodiment are described with reference to FIG. 15. FIG. 15 is a flowchart showing a flow of processing of a fifth imaging processing program that is executed by the CPU 40 of the digital camera 10 according to this fifth exemplary embodiment when the release switch passes through the half-pressed state and transitions to the fully pressed state. Steps in FIG. 15 that execute processing the same as in FIG. 9 are assigned the same step numbers as in FIG. 2 and are not described. Here too, in order to avoid complexity, a case in which operation of the focus bracket imaging function has been caused to operate by a user is described.

In step 124' of FIG. 15, reconstruction processing is executed to the reference image with the reconstruction filter, similarly to the processing of step 110' of the fourth imaging processing program according to the fourth exemplary embodiment. Thus, a degree of blur (or sharpness) of the reference image is brought closer to a degree of blur (sharpness) of a non-reference image. In step 128', reconstruction processing with the same reconstruction filter is executed to the non-reference image, bringing the degree of blur of the non-reference image closer to the degree of blur of the reference image.

In the present embodiment too, the same effects as in the second exemplary embodiment described above may be provided.

Sixth Exemplary Embodiment

Now, a sixth exemplary embodiment of the present invention is described in detail. Structures of the digital camera 10 according to the sixth exemplary embodiment are the same as in the digital camera 10 according to the first exemplary embodiment shown in FIG. 1, so are not described here.

Figure 16:
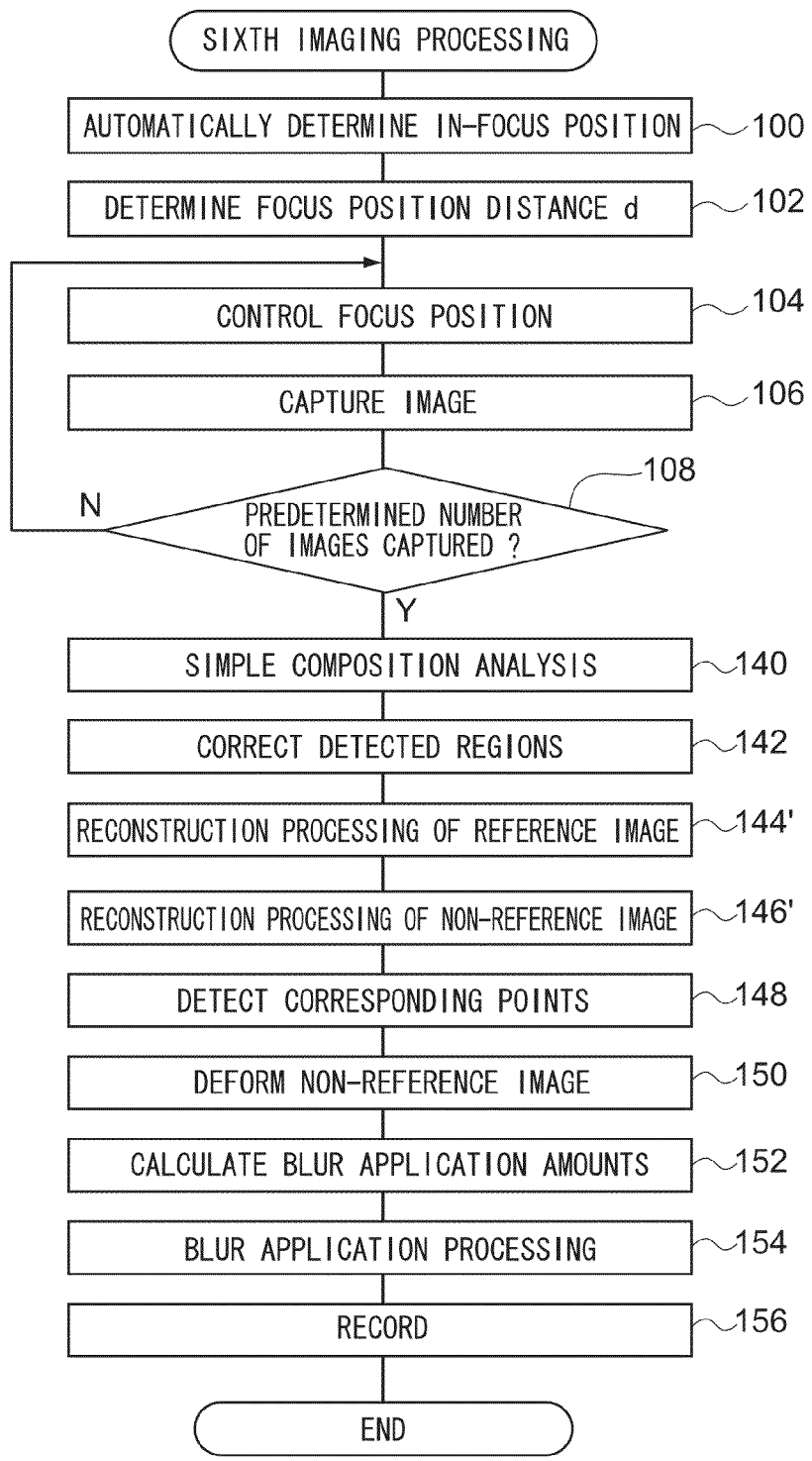
FIG. 16 is a flowchart showing the flow of processing of a sixth imaging processing program in accordance with a sixth exemplary embodiment.

Herebelow, operations of the digital camera 10 in accordance with this sixth exemplary embodiment are described with reference to FIG. 16. FIG. 16 is a flowchart showing a flow of processing of a sixth imaging processing program that is executed by the CPU 40 of the digital camera 10 according to this sixth exemplary embodiment when the release switch passes through the half-pressed state and transitions to the fully pressed state. Steps in FIG. 16 that execute processing the same as in FIG. 11 are assigned the same step numbers as in FIG. 11 and are not described. Here too, in order to avoid complexity, a case in which operation of the focus bracket imaging function has been caused to operate by a user is described.

In step 144' of FIG. 16, reconstruction processing, with a reconstruction filter similar to that in the processing of step 110' of the fourth imaging processing program according to the fourth exemplary embodiment, is executed to the non-main subject region of the reference image that has been corrected by the processing of the above-described step 142. Thus, a degree of blur (or sharpness) of the non-main subject region in the reference image is brought closer to a degree of blur (sharpness) of the non-main subject region in the non-reference image. In step 146', the reconstruction processing is executed to the main subject region of the non-reference image that has been corrected by the processing of step 142. Thus, a degree of blur (or sharpness) of the main subject region in the non-reference image is brought closer to a degree of blur (sharpness) of the main subject region in the reference image.

In the present embodiment too, the same effects as in the third exemplary embodiment described above may be provided.

Seventh Exemplary Embodiment

Now, a seventh exemplary embodiment of the present invention is described in detail. Structures of the digital camera 10 according to the seventh exemplary embodiment are the same as in the digital camera 10 according to the first exemplary embodiment shown in FIG. 1, so are not described here.

Herebelow, operations of the digital camera 10 in accordance with this seventh exemplary embodiment are described with reference to FIG. 17. FIG. 17 is a flowchart showing a flow of processing of a seventh imaging processing program that is executed by the CPU 40 of the digital camera 10 according to this seventh exemplary embodiment when the release switch passes through the half-pressed state and transitions to the fully pressed state. Steps in FIG. 17 that execute processing the same as in FIG. 2 are assigned the same step numbers as in FIG. 2 and are not described. Here too, in order to avoid complexity, a case in which operation of the focus bracket imaging function has been caused to operate by a user is described.

As shown in FIG. 17, the seventh imaging processing program according to the present exemplary embodiment differs from the first imaging processing program according to the above-described first exemplary embodiment in that the processing of a step 153 is employed instead of the processing of steps 152 and 154.

Specifically, in step 153 of FIG. 17, the blur-adjusted image is generated by synthesizing the non-reference image deformed by the processing of the above-described step 150 with the reference image. Herebelow, a procedure for this synthesis is described.

First, for the reference image and each of the deformed non-reference images, the CPU 40 calculates the sharpness of each pixel by calculating output values from the Laplacian filter processing described above.

Then, for each pixel, the CPU 40 determines in which image the calculated sharpness is greatest and, if the image in which the sharpness is greatest is the reference image, employs the pixel value of the reference image as a pixel value of the blur-adjusted image. Alternatively, if the image in which the calculated sharpness is greatest is an image in which the focus position is further than the in-focus position of the main subject (the far side) (in the present exemplary embodiment, an image with the image number 4 or 5), the CPU 40 employs the pixel value in an image in which the focus position is closer than the in-focus position of the main subject (the near side) as a pixel value in the blur-adjusted image, using the near side image that has point symmetry with that far side image about the reference image (i.e., in the present exemplary embodiment, the image with image number 2 if the image with the greatest sharpness has the image number 4, or the image with image number 1 if the image with the greatest sharpness has the image number 5). Further, if the image in which the calculated sharpness is greatest is a near side image (in the present exemplary embodiment, an image with the image number 1 or 2), the CPU 40 employs the pixel value in the far side image that has point symmetry with that near side image about the reference image as a pixel value in the blur-adjusted image (i.e., in the present exemplary embodiment, the image with image number 5 if the image with the greatest sharpness has the image number 1, or the image with image number 4 if the image with the greatest sharpness has the image number 2).

As is described in detail hereabove, according to the present exemplary embodiment, substantially the same effects as in the above-described first exemplary embodiment may be realized. In addition, because the blur-adjusted image is generated by synthesizing the reference image with the deformed non-reference images, the blur-adjusted image may be generated more easily than in a case in which the blur-adjusted image is generated by filter processing of the reference image.

Eighth Exemplary Embodiment

Now, an eighth exemplary embodiment of the present invention is described in detail. Structures of the digital camera 10 according to the eighth exemplary embodiment are the same as in the digital camera 10 according to the first exemplary embodiment shown in FIG. 1, so are not described here.

Herebelow, operations of the digital camera 10 in accordance with this eighth exemplary embodiment are described with reference to FIG. 18. FIG. 18 is a flowchart showing a flow of processing of an eighth imaging processing program that is executed by the CPU 40 of the digital camera 10 according to this eighth exemplary embodiment when the release switch passes through the half-pressed state and transitions to the fully pressed state. Steps in FIG. 18 that execute processing the same as in FIG. 17 are assigned the same step numbers as in FIG. 17 and are not described. Here too, in order to avoid complexity, a case in which operation of the focus bracket imaging function has been caused to operate by a user is described.

As shown in FIG. 18, the eighth imaging processing program according to the present exemplary embodiment differs from the seventh imaging processing program according to the above-described seventh exemplary embodiment in that the processing of a step 153' is employed instead of the processing of step 153.

Specifically, in step 153' of FIG. 18, the blur-adjusted image is generated by synthesizing the non-reference image deformed by the processing of the above-described step 150 with the reference image. Herebelow, a procedure for this synthesis is described.

First, for the reference image and each of the deformed non-reference images, the CPU 40 calculates the sharpness of each pixel by calculating output values from the Laplacian filter processing described above.

Then, for each pixel, the CPU 40 employs the pixel value of the image in which the sharpness is greatest as a pixel value in the blur-adjusted image. The blur-adjusted image obtained by the eighth image processing program according to the present exemplary embodiment is a fully focused image in which both the main subject region and the non-main subject region are in focus.

In the present exemplary embodiment too, the same effects as in the seventh exemplary embodiment described above may be provided.

Hereabove, the present invention has been described using exemplary embodiments, but the technical scope of the present invention is not to be limited to the scope described in the above exemplary embodiments. Numerous modifications and improvements may be applied to the above exemplary embodiments within a scope not departing from the spirit of the invention, and modes to which these modifications and/or improvements are applied are to be encompassed by the technical scope of the invention.

Furthermore, the exemplary embodiments described above are not to limit the inventions relating to the claims, and means for achieving the invention are not necessarily to be limited to all of the combination of features described in the exemplary embodiments. Various stages of the invention are included in the above exemplary embodiments, and various inventions may be derived by suitable combinations of the plural structural elements that are disclosed. If some structural element is omitted from the totality of structural elements illustrated in the exemplary embodiments, as long as the effect thereof is provided, a configuration from which the some structural element is omitted may be derived to serve as the invention.

For example, in the second, third, fifth and sixth exemplary embodiments as described above, cases are described in which information obtained by the AF function is used for composition analysis and simple composition analysis, but the present invention is not limited thus. For example, modes similar to these exemplary embodiments may be employed, in which division regions of an image are based on color information of a captured image, and a focus position may be calculated for each of these division regions in the same manner as the AF function. Other modes are possible such as, in a digital camera with a face detection function, a mode in which a face region obtained using the face detection function and a torso region extrapolated from the face region are specified as the main subject region and other regions are specified as the non-main subject region.

Further, in the exemplary embodiments described above, cases are described in which an inverse filter of a smoothing filter is employed as the filter that performs sharpening processing of the present invention, but the present invention is not limited thus. For example, a mode is possible in which an inverse filter of a Wiener filter or another low-pass filter is employed.

In the exemplary embodiments described above, cases are described in which smoothing processing or sharpening processing (reconstruction processing) is always executed to at least one of a reference image and a non-reference image before corresponding points are detected, but the present invention is not limited thus. For example, a mode is possible in which it is determined whether a difference in focus position between the reference image and the non-reference image is greater than a predetermined amount, and the smoothing processing or sharpening processing is executed only if there is such a difference.

In the exemplary embodiments described above, cases are described in which corresponding points are detected over the whole image, but the present invention is not limited thus. For example, a mode is possible in which detection is applied only to corresponding points in a region in which the degrees of blurring have been brought closer together by the smoothing processing or sharpening processing.

In the exemplary embodiments described above, cases are described in which the various kinds of processing, such as the smoothing processing, the sharpening processing, the processing for detecting corresponding points, the processing for deforming the non-reference image and the processing for synthesizing images, are executed in software by programs, but the present invention is not limited thus. Modes are possible in which these processes are executed in hardware, and modes are possible in which the processes are executed in both hardware and software.

Further, the structure of the digital camera 10 described in the above exemplary embodiments (see FIG. 1) is an example. It will be clear that unnecessary portions may be removed, new portions may be added, and states of connection and the like may be modified, within a scope not departing from the spirit of the present invention.

The flows of processing of the various imaging processing programs described in the above exemplary embodiments (see FIG. 2, FIG. 9, FIG. 11, FIG. 13 and FIG. 15 to FIG. 18) are also examples, and it will be clear that unnecessary steps may be removed, new steps may be added and sequences of processing may be rearranged, within a scope not departing from the spirit of the present invention.

The disclosures of Japanese Patent Application No. 2011-080034 are incorporated into the present specification by reference in their entirety. All references, patent applications and technical specifications cited in the present specification are incorporated by reference into the present specification to the same extent as if the individual references, patent applications and technical specifications were specifically and individually recited as being incorporated by reference.

What is claimed is:

1. An imaging device comprising:
   an imaging unit that acquires a plurality of images including an image in which at least a main subject is in focus, by discretely moving a focus position and successively capturing each of the plurality of images;
   an image processing unit that executes image processing with respect to at least one of a reference image or a non-reference image other than the reference image, to bring degree of blur of the non-reference image closer to the reference image, the reference image being the image in which the main subject is in focus among the plurality of images acquired by the imaging unit;
   a detection unit that detects corresponding points of a subject in the reference image and the non-reference image, subsequent to execution of the image processing by the image processing unit;
   a deformation unit that deforms the non-reference image from before the execution of the image processing by the image processing unit such that positions of the corresponding points detected by the detection unit coincide;
   a generation unit that generates a blur-adjusted image on the basis of the reference image and the non-reference image that is deformed by the deformation unit; and
   a recording unit that records the blur-adjusted image generated by the generation unit at a recording medium.

2. The imaging device according to claim 1, wherein the image processing unit executes at least one of smoothing processing or sharpening processing as the image processing.

3. The imaging device according to claim 2, wherein the image processing unit executes the at least one of smoothing processing or sharpening processing by filter processing with a pre-specified first filter characteristic.

4. The imaging device according to claim 3, wherein the first filter characteristic is pre-specified on the basis of focus positions when the reference image and the non-reference image are captured.

5. The imaging device according to claim 1, further comprising a specification unit that specifies, in an image acquired by imaging by the imaging unit, a main subject region and a non-main subject region which is a subject region excluding the main subject region,
   wherein the image processing unit executes the image processing with respect to whichever of the main subject region or the non-main subject region specified by the specification unit has the larger area.

6. The imaging device according to claim 1, further comprising a specification unit that specifies, in an image acquired by imaging by the imaging unit, a main subject region and a non-main subject region which is a subject region excluding the main subject region,
   wherein, if the image processing includes smoothing processing, the image processing unit executes the smoothing processing to both the main subject region of the reference image and the non-main subject region of the non-reference image, and if the image processing includes sharpening processing, the image processing unit executes the sharpening processing to both the non-main subject region of the reference image and the main subject region of the non-reference image.

7. The imaging device according to claim 1, further comprising a calculation unit that calculates a blur application amount corresponding to coordinates of a pixel from some of the plurality of images, which include the non-reference image deformed by the deformation unit,
   wherein the generation unit determines a second filter characteristic on the basis of a calculation result by the calculation unit, and generates the blur-adjusted image by executing filter processing with the determined filter characteristic to the reference image.

8. The imaging device according to claim 7, wherein the second filter characteristic is pre-specified on the basis of focus positions when the reference image and the non-reference image are captured.

9. The imaging device according to claim 1, wherein the generation unit generates the blur-adjusted image by synthesizing the reference image with the non-reference image deformed by the deformation unit.

10. The imaging device according to claim 1, wherein the generation unit generates the blur-adjusted image such that a degree of blur of a non-main subject region is larger than a degree of blur of a main subject region.

11. An imaging method comprising:
    an imaging step of acquiring a plurality of images including an image in which at least a main subject is in focus, by discretely moving a focus position and successively capturing each of the plurality of images;
    an image processing step of executing image processing with respect to at least one of a reference image or a non-reference image other than the reference image, to bring degree of blur of the non-reference image closer to the reference image, the reference image being the image in which the main subject is in focus among the plurality of images acquired by the imaging step;
    a detecting step of detecting corresponding points of a subject in the reference image and the non-reference image, subsequent to execution of the image processing by the image processing step;
    a deforming step of deforming the non-reference image from before the execution of the image processing by the image processing step such that positions of the corresponding points detected by the detecting step coincide;
    a generation step of generating a blur-adjusted image on the basis of the reference image and the non-reference image that is deformed by the deforming step; and
    a recording step of recording the blur-adjusted image generated by the generation step at a recording medium.

12. A non-transitory computer readable medium storing program for causing a computer to function as:
- an imaging unit that acquires a plurality of images including an image in which at least a main subject is in focus, by discretely moving a focus position and successively capturing each of the plurality of images;
- an image processing unit that executes image processing with respect to at least one of a reference image or a non-reference image other than the reference image, to bring degree of blur of the non-reference image closer to the reference image, the reference image being the image in which the main subject is in focus among the plurality of images acquired by the imaging unit;
- a detection unit that detects corresponding points of a subject in the reference image and the non-reference image, subsequent to execution of the image processing by the image processing unit;
- a deformation unit that deforms the non-reference image from before the execution of the image processing by the image processing unit such that positions of the corresponding points detected by the detection unit coincide;
- a generation unit that generates a blur-adjusted image on the basis of the reference image and the non-reference image that is deformed by the deformation unit; and
- a recording unit that records the blur-adjusted image generated by the generation unit at a recording medium.

\* \* \* \* \*